(12) United States Patent
Godard et al.

(10) Patent No.: US 9,747,218 B2
(45) Date of Patent: Aug. 29, 2017

(54) CPU SECURITY MECHANISMS EMPLOYING THREAD-SPECIFIC PROTECTION DOMAINS

(71) Applicant: Mill Computing, Inc., Palo Alto, CA (US)

(72) Inventors: Roger Rawson Godard, East Palo Alto, CA (US); Arthur David Kahlich, Sunnyvale, CA (US); Jan Schukat, Berlin (DE)

(73) Assignee: Mill Computing, Inc., Palo Alto, CA (US)

( * ) Notice: Subject to any disclaimer, the term of this patent is extended or adjusted under 35 U.S.C. 154(b) by 105 days.

(21) Appl. No.: 14/663,760

(22) Filed: Mar. 20, 2015

(65) Prior Publication Data

US 2016/0274810 A1    Sep. 22, 2016

(51) Int. Cl.
  *G06F 12/08*   (2016.01)
  *G06F 12/0893*  (2016.01)
  *G06F 12/0875*  (2016.01)

(52) U.S. Cl.
  CPC ...... *G06F 12/0893* (2013.01); *G06F 12/0875* (2013.01); *G06F 2212/60* (2013.01)

(58) Field of Classification Search
  CPC .... G06F 3/0622; G06F 3/0637; G06F 3/0671; G06F 3/0604; G06F 3/0638; G06F 12/0875; G06F 12/0893
  USPC ......................................... 711/125
  See application file for complete search history.

(56) References Cited

U.S. PATENT DOCUMENTS

| | | | |
|---|---|---|---|
| 6,546,546 | B1 | 4/2003 | Van Doorn |
| 6,604,123 | B1 | 8/2003 | Bruno et al. |
| 7,287,140 | B1 * | 10/2007 | Asanovic ............ G06F 12/1483 |
| | | | 711/163 |
| 7,437,521 | B1 | 10/2008 | Scott et al. |
| 9,122,890 | B2 * | 9/2015 | Grocutt .................. G06F 21/52 |
| 2005/0198479 | A1 | 9/2005 | Bean et al. |

(Continued)

FOREIGN PATENT DOCUMENTS

WO   WO 2010/151267 A1   12/2010

OTHER PUBLICATIONS

Early Capability Architectures, Capability Based-Computer Systems, Henry M. Levy, 1984, pp. 41-47.

(Continued)

*Primary Examiner* — Pierre-Michel Bataille
(74) *Attorney, Agent, or Firm* — Gordon & Jacobson, P.C.

(57) ABSTRACT

A computer processor includes an instruction processing pipeline that interfaces to a hierarchical memory system employing an address space. The instruction processing pipeline includes execution logic that executes at least one thread in different protection domains over time, wherein the different protection domains are defined by region descriptors each including first data specifying a memory region of the address space employed by the hierarchical memory system and second data specifying permissions for accessing the associated memory region. The address space can be a virtual address space or a physical address space. The protection domains can be associated with different turfs each representing a collection of region descriptors. A given thread can execute in a particular turf, one turf at a time. The particular turf can be selectively configured to change over time.

28 Claims, 19 Drawing Sheets

(56) References Cited

U.S. PATENT DOCUMENTS

| | | |
|---|---|---|
| 2011/0276760 A1 | 11/2011 | Chou |
| 2014/0075581 A1* | 3/2014 | Grocutt .................. G06F 21/52 726/30 |
| 2015/0106566 A1 | 4/2015 | Godard et al. |
| 2015/0370717 A1 | 12/2015 | Godard et al. |

OTHER PUBLICATIONS

Mondrian Memory Protection, Emmett Witchel et al., MIT Laboratory for Computer Science, 2002.
Mondrix: Memory Isolation for Linux Using Mondriaan Memory Protection, Emmett Witchel et al., 2005.

* cited by examiner

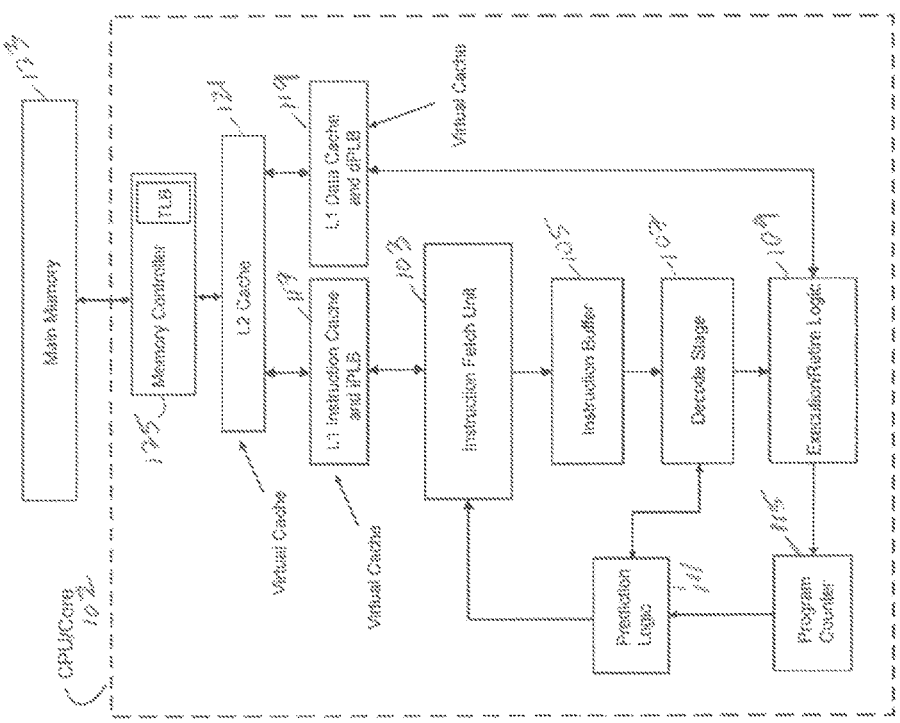

Portal Entry

Stacklet Info Block

CPU SECURITY MECHANISMS EMPLOYING THREAD-SPECIFIC PROTECTION DOMAINS

BACKGROUND OF THE INVENTION

1. Field of the Invention

The present disclosure relates to computer processing systems.

2. State of the Art

A computer processor and the program which it executes needs places to put data for later reference. A computer processor will typically have many such places, each with its own trade off of capacity, speed of access, and cost. Usually these are arranged in a hierarchal manner referred to as the memory system of the computer processing system, with small, fast, costly places used for short lived small data and large, slow and cheap places used for what doesn't fit in the small, fast, costly places. The hierarchical memory system typically includes the following components arranged in order of decreasing speed of access:

- register file or other form of fast operand storage;
- one or more levels of cache memory (one or more levels of the cache memory can be integrated with the processor (on-chip cache) or separate from the processor (off-chip cache);
- main memory (or physical memory), which is typically implemented by DRAM memory and/or NVRAM memory and/or ROM memory; and
- on-line mass storage (typically implemented by one or more hard disk drives).

In many computer processing systems, the main memory can take several hundred cycles to access. The cache memory, which is much smaller and more expensive but with faster access as compared to the main memory, is used to keep copies of data that resides in the main memory. If a reference finds the desired data in the cache (a cache hit) it can access it in a few cycles instead of several hundred when it doesn't (a cache miss). Because a program typically has nothing else to do while waiting to access data in memory, using a cache and making sure that desired data is copied into the cache can provide significant improvements in performance.

The address space of the program can employ virtual memory, which provides for two different purposes in modern processors. One purpose, hereinafter paging, permits the totality of the address spaces used by all programs to exceed the capacity of the main memory attached to the processor. The other purpose, hereinafter address extension, permits the totality of the address spaces used by all programs to exceed the address space supported by the processor.

Paging can be used to map the virtual addresses used by the program at page granularity to physical addresses recognized by the main memory or to devices such as disk that are used as paging store. The set of valid virtual addresses usable without error by a program is called its address space. The address mapping is represented by a set of mapping tables maintained by the operating system as it allocates and de-allocates memory for the various running programs. Every virtual address must be translated to the corresponding physical address before it may be used to access physical memory.

Systems with caches differ in whether cache lines store tags defined by a physical address (physical caching) or a virtual address (virtual caching). In the former, virtual addresses must be translated at least before they are used to match against the physical addressed tags of the cache; in the latter, translation occurs after cache access and is avoided if the reference is satisfied from cache.

Address extension is not needed when the space encompassed by the representation of a program address is large enough. Common representations of program address space are four bytes (32 bits) and eight bytes (64 bytes). The four-byte representation (yielding a four gigabyte address space) is easily exceeded by modern programs, so addresses (and address spaces) must be reused with different meanings by different programs and address extension must be used. Reuse of the same address by different programs is called aliasing. The computer processing system must disambiguate aliased use of addresses before they are actually used in the memory hierarchy.

In a computer processing system employing physical caching, alias disambiguation occurs prior to the caches. In a computer processing system employing virtual caching, disambiguation can occur after the caches if the caches are restricted to hold only memory from a single one of the aliased addressed spaces. Such a design requires that cache contents be discarded whenever the address space changes. However, the total space used by even thousands of very large programs will not approach the size representable in 64 bits, so aliasing need not occur and address extension is unnecessary in 64-bit machines. A computer processing system that does not use address extension permits all programs to share a single, large address space; such a design is said to use the single-address-space model.

It happens that the same hardware can be used both to disambiguate aliases and to map physical memory, and such is the common arrangement. Because alias disambiguation is typically performed prior to physical caches, using the common hardware means that page mapping occurs their too. When paging and alias disambiguation are in front of physical caches, it is also common to use the same hardware for access control, restricting the kinds of access and the addresses accessible to the program. The hardware enforced restrictions comprise the protection model of the processor and memory system. Protection must apply to cache accesses, so the protection machinery must be ahead of the caches. Hence it is common to have one set of hardware that intercepts all accesses to the memory hierarchy and applies protection restriction, alias disambiguation, and page mapping all together. Because all this must be performed for every reference to memory, and specifically must be performed before cache can be accessed, the necessary hardware is power hungry, large and on the critical path for program performance.

Furthermore, modern CPU architectures support protected multiprocessing where different program invocations are given their own sets of private resources (a process) and then run in parallel, with a combination of hardware and software ensuring that no program can inspect or change the private resources of any other. This protected multiprocessing is often accomplished by letting the CPU execute the code of one process for a while (with access to the resources of that process), and then changing the hardware execution environment to that of another process and running that one for a while with access to the resources of the second but no longer with access to the resources of the first. Changing from running one process to running another is called a process switch and is very expensive in machine terms because of the amount of state that has to be saved and restored as the process context is changed.

A process can contain multiple threads. A thread is a sequence of one or more instructions executed by the CPU. Typically, threads are used for small tasks, whereas processes are used for more heavyweight tasks, such as the execution of applications. Another difference between a thread and a process is that threads within the same process share the same address space, whereas different processes do not. This allows threads to read from and write to the same data structures and variables, and also facilitates communication between threads.

Communication between processes (also known as inter-process communication) can be quite difficult and resource-intensive. For example, one process may be the source of some data that it computes or reads from a file, while the second is a sink for the data which it uses in its own operation or writes out to a file in turn. In the usual arrangement, the processes arrange for a buffer to be created as a shared resource in memory that they both have access to. The source then fills the buffer with data and triggers a process switch to the sink. The sink consumes the data, and then triggers a process switch back to the source for more data. Each buffer full thus involves two process switches. In addition, the processes must establish some protocol to make sure that (for example) the source doesn't start putting more data into the buffer before the sink has finished emptying it of the previous data. Such protocols are difficult to write and a frequent source of subtle bugs.

Communication between the threads of a process is much easier. In one method, both source and sink threads can run concurrently (on separate cores) or semi-concurrently (being swapped in and out of a single core), and communicate using shared data structures similar to inter-process communication. In a second method, only one thread is active at a time (no matter how many cores are available), and a special operation or system function permits the running thread to give up control to an idle thread, possibly passing arguments to the idle thread. This method is typically referred to as "coroutines," and the operation that stops the active thread and passes control to the idle thread is often called a "visit." Processes can also communicate as coroutines.

The difference between process and thread-based communication is that the threads share their whole environment, while processes don't, although they may share limited quantities of state for purposes of the communication. Thus, current CPU architectures require that the program code of the cooperating source and sink threads share resource environments. If the code of the source and sink are to have private resource sets, they must be organized as separate processes and utilize the process switch machinery and a custom protocol.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processor including an instruction processing pipeline that interfaces to a hierarchical memory system employing an address space. The instruction processing pipeline includes execution logic that executes at least one thread in different protection domains over time, wherein the different protection domains are defined by region descriptors each including first data specifying a memory region of the address space employed by the hierarchical memory system and second data specifying permissions for accessing the associated memory region.

The address space can be a virtual address space or a physical address space. The protection domains can be associated with different turfs each representing a collection of region descriptors. A given thread can execute in a particular turf, one turf at a time. The particular turf can be selectively configured to change over time.

In one embodiment, the region descriptors are each associated with a thread ID-turf ID pair. The thread ID of the thread ID-turf ID pair can have a configuration that specifies a wildcard identifier corresponding to any thread being executed by the execution logic. The turf ID of the thread ID-turf ID pair can have a configuration that specifies a wildcard identifier corresponding to any turf being executed by the execution logic.

The region descriptors can be stored in at least one hardware table that is queried in conjunction with servicing requests that access the hierarchical memory system.

In one embodiment, the hierarchical memory system includes a top level instruction cache separate from a top level data cache. The region descriptors for memory regions that store instructions are stored in a first hardware table that is queried in conjunction with servicing fetch requests that are issued to the top level instruction cache for accessing instruction portions stored in the top level instruction cache. The region descriptors for memory regions that store operand data are stored in a second hardware table that is queried in conjunction with servicing memory requests that are issued to the top level data cache for loading operand data from or storing operand data in the top level data cache. The second data for region descriptors stored in the first hardware table can selectively specify an execute permission or a portal permission. The second data for region descriptors stored in the second hardware table can selectively specify a write permission or a read permission. The first hardware table can be queried in parallel with querying the top level instruction cache, and the second hardware table can be queried in parallel with querying the top level data cache.

In another embodiment, the protection domains can be further defined by descriptors for predefined memory regions of the address space that are stored in hardware registers of the computer processor. The predefined memory regions can include at least one memory region selected from the group including: at least one turf-specific memory region, at least one thread-turf-specific memory region, and at least one thread-specific memory region. The at least one turf-specific memory region can include a first memory region that stores instructions for a particular turf, a second memory region that stores constants for a particular turf, and a third memory region that stores data for the particular turf. The at least one thread-turf-specific memory region can include a memory region that stores a stack portion for a particular thread-turf pair (e.g., a stack frame for the stacklet of the particular thread-turf pair as described herein). The at least one thread-specific memory region can include a memory region that stores thread local data for a particular thread.

The hardware registers that store the descriptors for the predefined memory regions of the address space can be accessed and processed in order to perform protection checking before querying the at least one hardware table that stores the region descriptors for protection checking. In certain circumstances, the protection checking carried out by accessing and processing the hardware registers that store the descriptors for the predefined memory regions of the address space avoids the protection checking carried out by accessing and processing the at least one hardware table that stores the region descriptors.

In yet another embodiment, at least one region descriptor can be associated with a given thread by a GRANT operation processed by the instruction processing pipeline. At least one region descriptor can be disassociated with a given thread by a REVOKE operation processed by the instruction processing pipeline. The REVOKE operation can be configured to unwind a specified previously executed GRANT operation. The REVOKE operation can be an explicit or implicit operation that is processed by the instruction processing pipeline.

In still another embodiment, at least one region descriptor can be temporarily associated with a given thread by a PASS operation processed by the instruction processing pipeline. The actions of the PASS operation can be configured to modify the region descriptors that are associated with a specific thread to a wildcard turf. The PASS operation can be grouped with a CALL operation and when a corresponding RETURN operation is executed, the region descriptors resulting from the PASS operation are removed in order to remove the permissions temporarily granted by the PASS operation.

The at least one hardware table storing the region descriptors can be backed to a region table stored in the memory system. The regions descriptors can be stored as entries in the hardware table where each entry includes a single bit that is processed when first adding the corresponding entry to the at least one hardware table and when evicting the corresponding entry from the at least one hardware table. Such processing can remove the corresponding entry from the at least one hardware table without accessing the region table for circumstances when the corresponding entry is not located in the region table.

In still another embodiment, the first data of at least one region descriptor specifies a memory region storing a portal entry associated with a particular function or service. The instruction processing pipeline can support a portal-type CALL operation with a pointer argument that refers to a given portal entry. The actions of the portal-type CALL operation process the given portal entry to switch to a different protection domain defined by the given portal entry without switching threads. The given portal entry can include a turf ID that refers to the different protection domain which is used during execution of the particular function or service associated with the given portal entry. The given portal entry can also include address data that refers to the entry address of the particular function or service. The given portal entry can also include state information that is restored to hardware registers for use during execution of the particular function or service. The given portal entry can act as indirect interface mechanism to the execution of the particular function or service.

In one embodiment, for the at least one region descriptor that specifies a memory region storing a portal entry, the second data of such region descriptor includes a portal permission. The portal permission of the second data of such region descriptor can be processed in conjunction with the execution of the portal-type CALL operation to distinguish the portal-type CALL operation from a normal-type CALL operation.

BRIEF DESCRIPTION OF THE DRAWINGS

FIG. 1 is a schematic block diagram of a computer processing system according to an embodiment of the present disclosure.

FIG. 2 is a schematic diagram of exemplary pipeline of processing stages that can be embodied by the computer processor of FIG. 1.

DETAILED DESCRIPTION OF THE PREFERRED EMBODIMENTS

Figure 3:
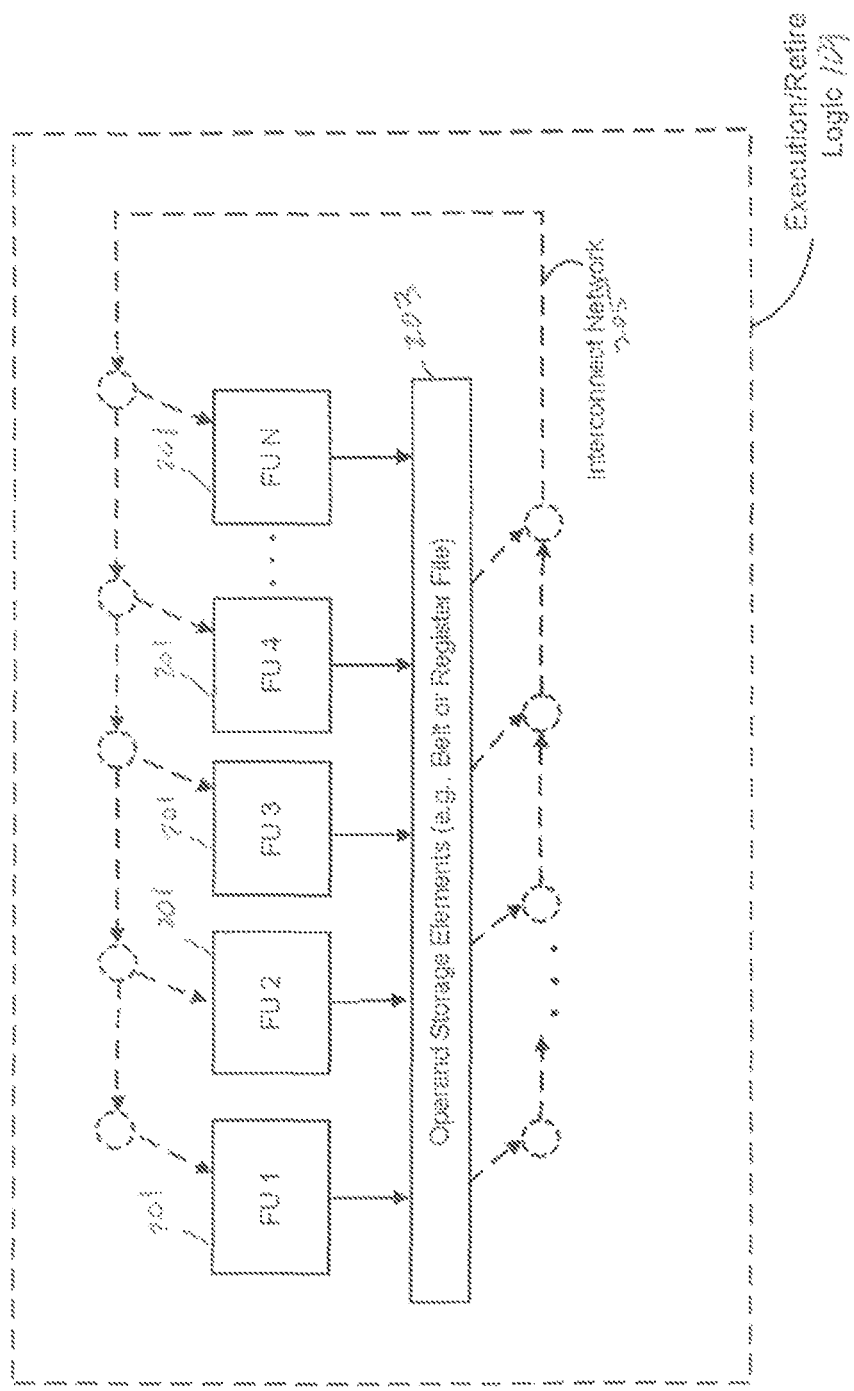
FIG. 3 is schematic illustration of components that can be part of the execution/retire logic of the computer processor of FIG. 1 according to an embodiment of the present disclosure.

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, store or branch operation.

The term "instruction" is a unit of logical encoding including zero or more operations. For the case where an instruction includes multiple operations, the multiple operations are semantically performed together.

The term "hierarchical memory system" is a computer memory system storing instructions and operand data for access by a processor in executing a program where the memory is organized in a hierarchical arrangement of levels of memory with increasing access latency from the top level of memory closest to the processor to the bottom level of memory furthest away from the processor.

The term "cache line" or "cache block" is a unit of memory that is accessed by a computer processor. The cache line includes a number of bytes (typically 4 to 128 bytes).

The term "stack" is a region of memory associated with a thread that implements a function or subroutine. When the thread of the function or subroutine executes, it may add a stack frame to the top of the stack by the actions of an explicit or implicit CALL operation; when the function or subroutine exits by executing a RETURN operation, the top stack frame may be removed from the stack.

The term "stacklet" is part of a stack associated with a particular thread executing in a particular turf as described herein. The stacklet stores stack frames generated by execution of the particular thread executing in the particular turf.

The term "stack frame" is a frame of data pushed onto a stacklet by an executing thread. Each stack frame corresponds to an explicit or implicit CALL operation to a function or subroutine whose execution as not yet terminated by a corresponding RETURN operation.

In accordance with the present disclosure, a sequence of instructions is stored in a hierarchical memory system and processed by a CPU (or Core) 102 as shown in the exemplary embodiment of FIG. 1. The CPU (or Core) 102 includes a number of instruction processing stages including at least one Instruction Fetch Unit (one shown as 103), at least one Instruction Buffer (one shown as 105), at least one Decode Stage (one shown as 107) and Execution Logic 109 that are arranged in a pipeline manner as shown. The CPU (or Core) 102 also includes Prediction Logic 111, at least one Program Counter (one shown as 115), at least one L1 Instruction Cache (one shown as 117), and an L1 Data Cache 119.

The L1 Instruction Cache 117 and the L1 Data Cache 119 are logically part of the hierarchical memory system. The L1 Instruction Cache 117 is a cache memory that stores copies of instruction portions stored in the Memory System 101 in order to reduce the latency (i.e., the average time) for accessing the instruction portions stored in the memory system. In order to reduce such latency, the L1 Instruction Cache 117 can take advantage of two types of memory localities, including temporal locality (meaning that the same instruction will often be accessed again soon) and spatial locality (meaning that the next memory access for instructions is often very close to the last memory access or recent memory accesses for instructions). The L1 Instruction Cache 117 can be organized as a set-associative cache structure, a fully associative cache structure, or a direct mapped cache structure as is well known in the art. Similarly, the L1 Data Cache 119 is a cache memory that stores copies of operands stored in the memory system in order to reduce the latency (i.e., the average time) for accessing the operands stored in the memory system 101. In order to reduce such latency, the L1 Data Cache 119 can take advantage of two types of memory localities, including temporal locality (meaning that the same operand will often be accessed again soon) and spatial locality (meaning that the next memory access for operands is often very close to the last memory access or recent memory accesses for operands). The L1 Data Cache 119 can be organized as a set-associative cache structure, a fully associative cache structure, or a direct mapped cache structure as is well known in the art.

The hierarchical memory system of the CPU/Core 102 can also include an L2 instruction/data cache 121 as well as main memory 123 as shown in FIG. 1. The caches 117, 119, 121 store tags defined by virtual addresses and thus are virtual caches. The protection model of the system can be enforced by two protection lookaside buffers, one labeled iPLB that can be viewed as part of the L1 Instruction Cache 117 and one labeled dPLB that can be viewed as part of the L1 Data Cache 119. Specifically, the protection lookaside buffer iPLB provides for access control of instructions, restricting the kinds of access and the addresses for instructions that are accessible to the program. The protection lookaside buffer dPLB provides for access control of operand data, restricting the kinds of access and the addresses for operand data that are accessible to the program. Such access control is enforced before program accesses to the corresponding cache are allowed to complete. However, the cache access may be carried out in parallel with the protection checking, which removes protection from the program critical path. A memory controller 125 provides an interface between cache and external main memory 123. The memory controller 125 supports virtual memory with paging where the virtual memory is divided into equal chunks of consecutive memory locations called pages. Pages are dynamically mapped to pages of the physical address space of the main memory 123 through a set of translation tables called page tables. In order to speed up virtual address translation, the memory controller 123 stores current address translations in a separate cache called the translation lookaside buffer (TLB). As noted above, a separate virtual address space or memory access hardware may exist for instructions and data. In this case, the memory controller 123 can include distinct TLBs for each access type, an Instruction Translation Lookaside Buffer (iTLB) and a Data Translation Lookaside Buffer (dTLB). Note that because the cache of the memory hierarchy are virtual caches, the protection function provided by the PLB(s) that are part of the top level cache is split from the virtual-to-physical address mapping function provided by the TLB(s) of the memory controller 123.

In other implementations, a single virtual address space or memory access hardware may exist for instructions and data. In this case, the top level of cache can include a single PLB, and the memory controller 123 can include a single TLB to handle both instructions and data. Other memory hierarchy organizations can also be used.

The Program Counter 115 stores the memory address for a particular instruction and thus indicates where the instruction processing stages are in processing the sequence of instructions. This memory address can be derived from a predicted (or resolved) target address of a control-flow operation (branch or call operation), the saved address in the case of a return operation, or the sum of memory address of the previous instruction and the length of previous instruction. The memory address stored in the Program Counter 115 can be logically partitioned into a number of high-order bits representing a cache line address ($ Cache Line) and a number of low-order bits representing a byte offset within the cache line for the instruction.

The Prediction Logic 111 employs a mechanism to predict the logical chain of instruction portions (e.g., cache lines) that is to be executed by the CPU 102. The prediction of the chain of instruction portions can be generated and stored ahead of the Decode Stage 107. The operation of the Prediction Logic 111 can be used to control prefetch operations that prefetch the cache lines that make up the logical chain of instruction portions. The operation of the Prediction Logic 111 can be used to control fetch operations carried out by the Instruction Fetch Unit 103 that fetch such cache lines from the L1 Instruction Cache 117 into the Instruction Buffer 105. The operation of the Prediction Logic 111 can be used to control read-out operations that read-out the sequence of instructions within the logical chain of instruction portions from the Instruction Buffer 105 to the Decode Stage 107 as well as to control shifting operations that operate on cache lines to isolate each instruction for decoding and follow-on execution. During start-up and mispredict recovery, the logical chain of instruction portions begins at the target memory address stored by the Program Counter 115.

The Instruction Fetch Unit 103, when activated, sends a memory request to the L1 Instruction Cache 117 to fetch a cache line from the L1 Instruction Cache 117 at a specified cache line address ($ Cache Line). This cache line address can be derived from the operation of the Prediction Logic 111. The L1 Instruction Cache 117 services this request (possibly accessing lower levels of the hierarchical memory system if missed in the L1 Instruction Cache 117), and supplies the requested cache line to the Instruction Fetch Unit 103. The Instruction Fetch Unit 103 passes the cache line returned from the L1 Instruction Cache 117 to the Instruction Buffer 105 for storage therein.

The Decode Stage 107 is configured to decode one or more instructions stored in the Instruction Buffer 105. Such decoding generally involves parsing and decoding the bits of the instruction to determine the type of operation(s) encoded by the instruction and generate control signals required for execution of the operation(s) encoded by the instruction by the Execution/Retire Logic 109.

The Execution/Retire Logic 109 utilizes the results of the Decode Stage 107 to execute the operation(s) encoded by the instructions. The Execution/Retire Logic 109 can send a load-type memory request to the L1 Data Cache 119 to load data from the L1 Data Cache 119 at a specified memory address. The L1 Data Cache 119 services this load-type memory request (possibly accessing the lower levels of the hierarchical memory system if missed in the L1 Data Cache 119), and supplies the requested data to the Execution/Retire Logic 109. The Execution/Retire Logic 109 can also send a store-type memory request to the L1 Data Cache 119 to store data into the memory system at a specified address. The L1 Data Cache 119 services this store-type memory request by storing such data at the specified address (which possibly involves overwriting data stored by the L1 Data Cache 119 and lowering the stored data to lower levels of the hierarchical memory system).

The instruction processing stages of the CPU (or Core) 102 can achieve high performance by processing each instruction and its associated operation(s) as a sequence of stages each being executable in parallel with the other stages. Such a technique is called "pipelining." An instruction and its associated operation(s) can be processed in five stages, namely, fetch, decode, issue, execute and retire as shown in FIG. 2.

In the fetch stage, the Instruction Fetch Unit 03 sends a request to the L1 Instruction Cache 117 to fetch a cache line from the L1 Instruction Cache 117 at a specified cache line address ($ Cache Line). The Instruction Fetch Unit 103 passes the cache line returned from the L1 Instruction Cache 117 to the Instruction Buffer 105 for storage therein.

In the decode stage, one or more instructions stored in the Instruction Buffer 105 are decoded by the Decode Stage 107. Such decoding generally involves parsing and decoding the bits of the instruction to determine the type of operation(s) encoded by the instruction and generating control signals required for execution of the operation(s) encoded by the instruction by the Execution/Retire Logic 109.

In the issue stage, one or more operations as decoded by the Decode Stage 107 are issued to the Execution/Retire Logic 109 and begin execution.

In the execute stage, issued operations are executed by the functional units of the Execution/Retire Logic 109 of the CPU/Core 102.

In the retire stage, the results of one or more operations produced by the Execution/Retire Logic 109 are stored by the CPU/Core 102 as transient result operands for use by one or more other operations in subsequent issue/execute cycles.

The Execution/Retire Logic 109 includes a number of functional units (FUs) which perform primitive steps such as adding two numbers, moving data from the CPU proper to and from locations outside the CPU such as the memory hierarchy, and holding operands for later use, all as are well known in the art. Also within the execution/retire logic 109 is a connection fabric or interconnect network connected to the FUs so that data produced by a producer (source) FU can be passed to a consumer (sink) FU for further storage or operations. The FUs and the interconnect network of the Execution/Retire logic 109 are controlled by the executing program to accomplish the program aims.

During the execution of an operation by the Execution/Retire Logic 109 in the execution stage, the functional units can access and/or consume transient operands that have been stored by the retire stage of the CPU/Core 102. Note that some operations take longer to finish execution than others. The duration of execution, in machine cycles, is the execution latency of an operation. Thus, the retire stage of an operation can be latency cycles after the issue stage of the operation. Note that operations that have issued but not yet completed execution and retired are "in-flight." Occasionally, the CPU/Core 102 can stall for a few cycles. Nothing issues or retires during a stall and in-flight operations remain in-flight.

FIG. 3 is a schematic diagram illustrating the architecture of an illustrative embodiment of the Execution/Retire logic 109 of the CPU/Core 102 of FIG. 1 according to the present disclosure, including a number of functional units 201. The execution/retire logic 109 also includes a set of operand storage elements 203 that are operably coupled to the functional units 201 of the execution/retire logic 109 and configured to store transient operands that are produced and referenced by the functional units of the execution/retire logic 109. An interconnect network 205 provides a physical data path from the operand storage elements 203 to the functional units that can possibly consume the operand stored in the operand storage elements. The interconnect network 205 can also provide the functionality of a bypass routing circuit (directly from a producer functional unit to a consumer function unit).

The protection model of the CPU dictates which parts of the virtual address space of the memory system can and cannot be accessed by different parts of program code dynamically as the program code executes on the CPU. In accordance with one embodiment of the present application, the protection model of the CPU employs region descriptors where each region descriptor defines a particular address range within the virtual address space of the memory system together with meta-data that includes a set of permissions that grant or deny certain access rights to the particular address range. The region descriptors are grouped together to form a turf, which is a collection of address ranges and associated permissions. The region descriptors that belong to a given turf can be associated with a particular thread during execution of the thread. In this sense, the particular thread executes within the given turf and the regions descriptors that belong to the given turf are used during execution of the particular thread to dictate which parts of the virtual address space of the memory system can and cannot be accessed by the execution of the particular thread. A thread is a contained flow of execution. Each thread is identifiable by a thread ID. For an implementation where the memory system is organized with separate virtual address space for instructions and data, the region descriptors are stored as entries in the two PLBs, where the entries of the iPLB store instruction-type region descriptors pertaining to memory regions of the virtual address space that contain instructions (code), and where the entries of the dPLB stores data-type region descriptors pertaining to memory regions of the virtual address space that contain data. The iPLB can be organized as a set-associative cache structure, a fully associative cache structure, or a direct mapped cache structure as is well known in the art. Similarly, the dPLB can be organized as a set-associative cache structure, a fully associative cache structure, or a direct mapped cache structure as is well known in the art.

Figure 4:
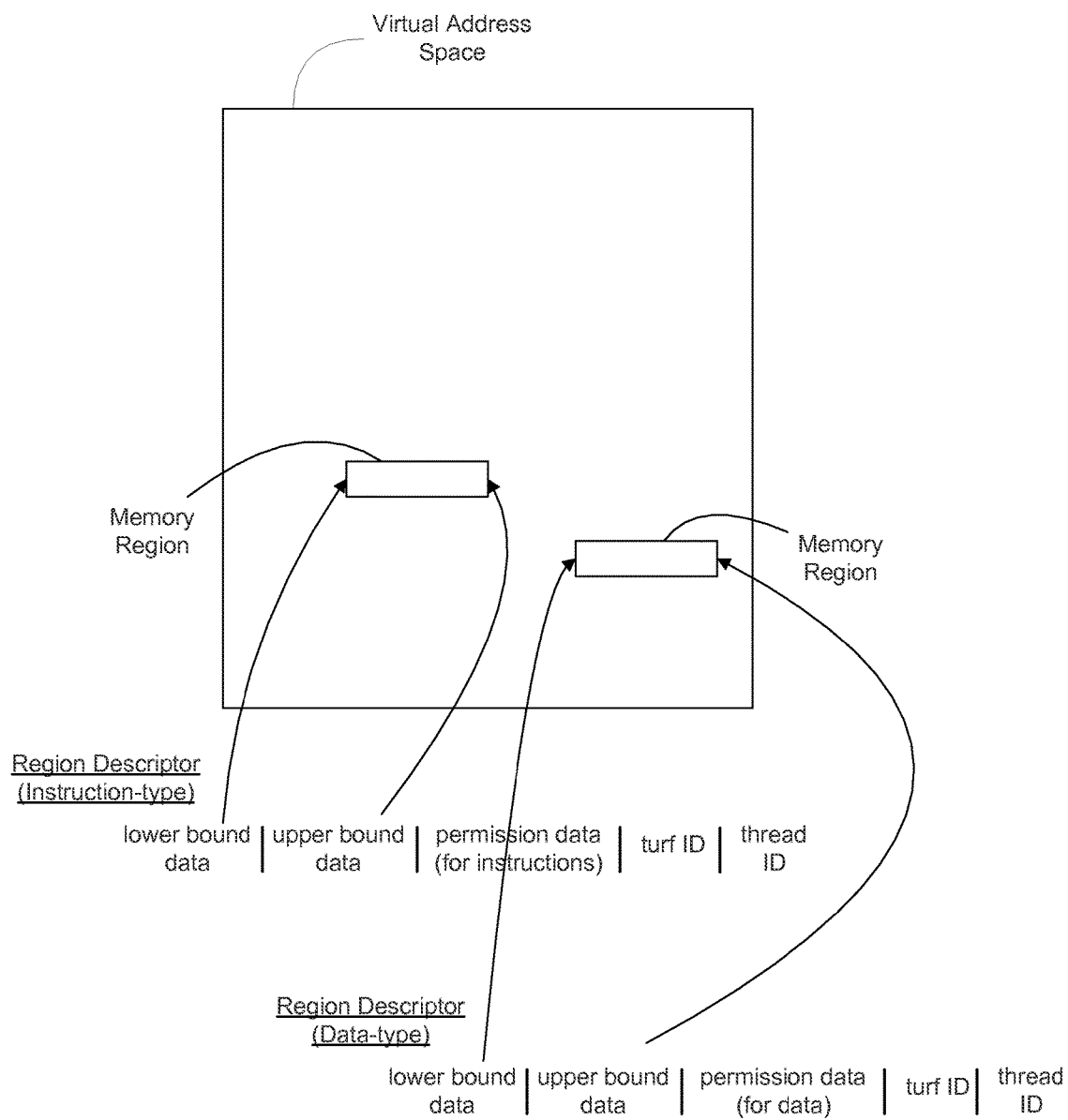
FIG. 4 is schematic illustration of the instruction-type and data-type region descriptors that are used by the computer processor of FIG. 1 to define and enforce protection domains for threads executing on the computer processor.
Figure 5A:
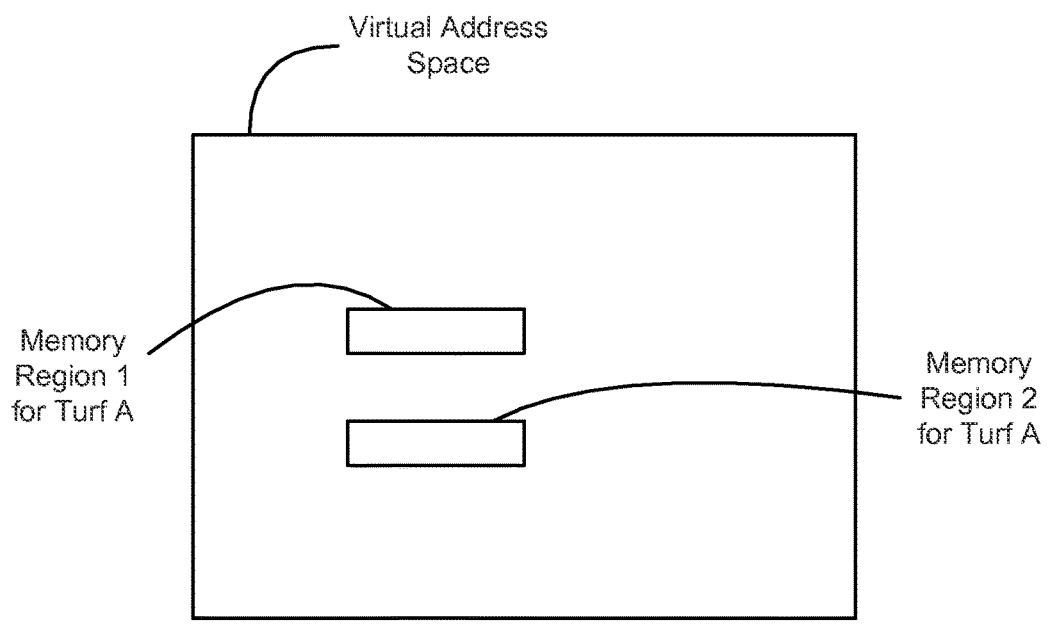
FIG. 5A is a schematic region of two disjoint memory regions specified by two instruction-type or data-type region descriptors.
Figure 5B:
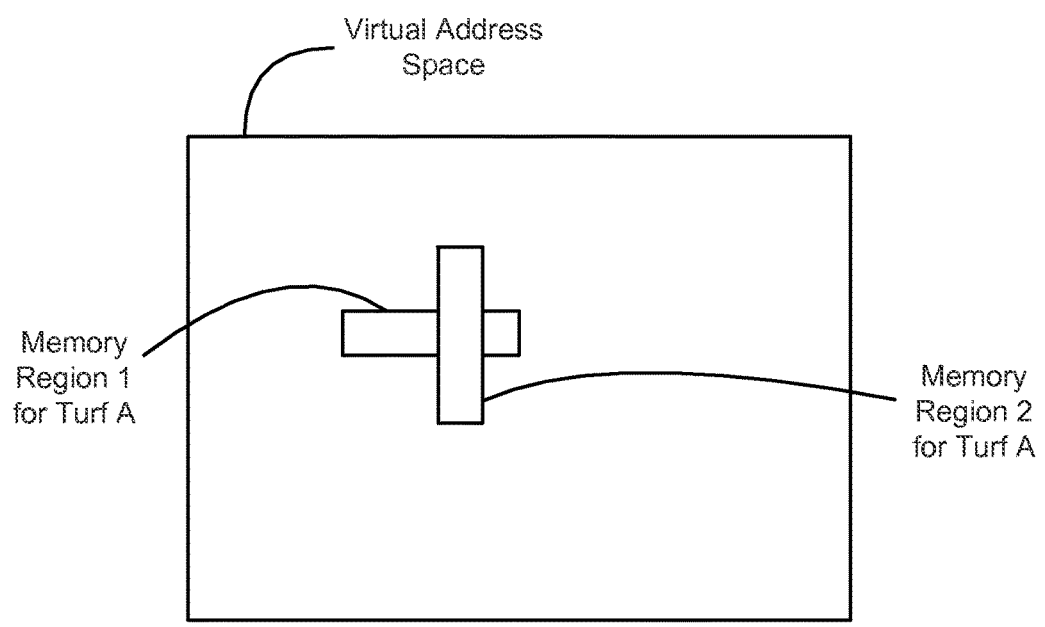
FIG. 5B is a schematic region of two partially overlapping memory regions specified by two instruction-type or data-type region descriptors.
Figure 5C:
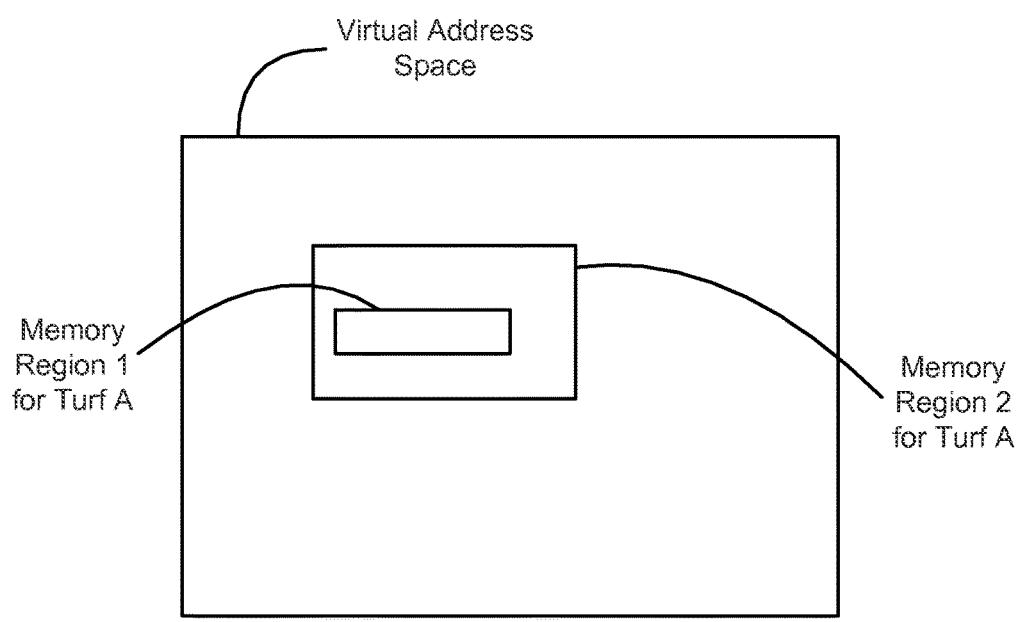
FIG. 5C is a schematic region of two overlapping memory regions specified by two instruction-type or data-type region descriptors.

FIG. 4 illustrates examples of the instruction-type region descriptors stored in the entries of the iPLB as well as the data-type region descriptors stored in the entries of the dPLB. Each instruction-type region descriptor includes data that defines a specific memory region with the virtual address space of the memory system with associated meta-data including permissions data, a turf ID, and a thread ID. The data that defines a specific memory region can specify the lower and upper bounds of the specific memory region as shown. The permissions data can be used to specify that certain access rights should be granted or denied (such as "execute" or "portal" permissions) with regard to accessing instructions stored the specific memory region. The turf ID can be used to identify a collection of memory regions, which includes all memory regions with instruction-type region descriptors that carry the same turf ID. The turf ID can possibly represent a wild-card identifier to specify that the specific memory region corresponds to all turfs. The thread ID can be used to specify that the instruction-type region descriptor belongs to the particular thread identified by the thread ID. The thread ID can possibly represent a wild-card ID to specify that the instruction-type region descriptor belongs to any thread that executes in the turf identified by the turf ID of the instruction-type region descriptor. The memory regions specified by the instruction-type region descriptors of the iPLB can be disjoint from one another as shown in FIG. 5A, partially overlap with one another as shown in FIG. 5B, or fully overlap with one another as shown in FIG. 5C. Thus, the instruction-type region descriptors of a turf specified by the iPLB can describe overlapping memory regions, possibly with different permissions (and thus different access rights). The same memory region can have several instruction-type region descriptors with different turf IDs and thus can belong to multiple turfs.

Each data-type region descriptors includes data that defines a specific memory region with the virtual address space of the memory system with associated meta-data including permissions data, a turf ID, and a thread ID. The data that defines a specific memory region can specify the lower and upper bounds of the specific memory region as shown. The permissions data can be used to specify that certain access rights should be granted or denied (such as read or write permissions) with regard to accessing data stored the specific memory region. The turf ID can be used to identify a collection of memory regions, which includes all memory regions with data-type region descriptors that carry the same turf ID. The turf ID can possibly represent a wild-card identifier to specify that the specific memory region corresponds to all turfs. The thread ID can be used to specify that the data-type region descriptor belongs to the particular thread identified by the thread ID. The thread ID can possibly represent a wild-card ID to specify that the data-type region descriptor belongs to any thread that executes in the turf identified by the turf ID of the data-type region descriptor. The memory regions specified by the data-type region descriptors of the dPLB can be disjoint from one another as shown in FIG. 5A, partially over overlap with one another as shown in FIG. 5B, or fully overlap with one another as shown in FIG. 5C. Thus, the data-type region descriptors of a turf specified by the dPLB can describe overlapping memory regions, possibly with different permissions (and thus different access rights). The same memory region can have several data-type region descriptors with different turf IDs and thus can belong to multiple turfs.

The entries (and corresponding instruction-type region descriptors) of the iPLB can be accessed in conjunction with a fetch request issued to the L1 Instruction Cache 117 (which can stem from the instruction stream flow or control transfer, including conditional or unconditional BRANCH or CALL or RETURN operations) to ensure that the executing thread whose actions issued the fetch request has requisite permission to access the instruction stored at the requested memory address (which can be a cache line address holding one or more instructions). In this manner, the virtual address space for instructions is protected, independent of the translation to physical addresses. The cache line addresses specified in the fetch requests employ virtual addresses as does the tags of the L1 Instruction Cache 117 and the instruction-type region descriptors of the iPLB that define the bounds of the specific memory region for a given instruction-type region descriptor. In one embodiment, the access and lookup of the iPLB can be performed in parallel with the access and lookup of the L1 Instruction Cache 117.

The entries (and corresponding data-type region descriptors) of the dPLB can be accessed by a memory request issued to L1 Data Cache 119 to ensure that the executing thread whose actions issued the memory request has requisite permission to access the operand data stored at the requested memory address (which can be a cache line address holding one or more bytes of operand data). In this manner, the virtual address space for data is protected, independent of the translation to physical addresses. The memory addresses specified in the memory request employs virtual addresses as does the tags of the L1 Data Cache 119 and the data-type region descriptors of the dPLB that define the bounds of the specific memory region for a given data-type region descriptor. In one embodiment, the access and lookup of the dPLB can be performed in parallel with the access and lookup of the L1 Data Cache 119.

Note that the iPLB and dPLB are of limited size and can run out of space. To address this issue, the region descriptors of both the iPLB and dPLB are backed by memory in a structure called the Region Table. The Region Table is set up by the operating system. The Region Table memory structure can be accessed in the event that a lookup of the iPLB or dPLB misses. In this case, the CPU hardware searches the Region Table for matching region descriptors which can then be hoisted up into the iPLB or dPLB for subsequent access.

In the protection model of the CPU, a thread executes in a turf—one turf at a time, but this turf can change over time. The CPU hardware includes two special purpose hardware registers (which is referred to herein as "specReg") that hold both the thread ID and turf ID for each thread that is currently executing on the CPU. Note that more than one thread can execute concurrently on the CPU for the case where the CPU includes multiple cores. Each one of these threads corresponds to a unique thread and turf combination, which can be identified by the unique thread ID-turf ID pair corresponding to the thread ID of a particular thread and the turf ID for the particular turf that the particular thread is currently executing in. For each one of these thread-turf combinations, the CPU hardware can utilize the instruction-type and data-type region descriptors that hold a thread ID and turf ID that match the thread ID and turf ID stored in SpecReg register (as well as the instruction-type and data-type region descriptors that hold a wildcard ID for turf and a thread ID that matches the thread ID stored in SpecReg for the given thread and the instruction-type and data-type region descriptors that hold a wildcard ID for thread and a turf ID that matches the turf ID stored in SpecReg for the given thread) to dictate the security permissions associated with the memory regions of the turf of the given thread. Note that more than one thread can execute in the same turf concurrently, and thus multiple threads can see and use the memory regions of the same turf concurrently according to the permissions associated with the memory regions of that turf.

Note that the hardware-based PLB processing consumes computational resources and power that ideally would be avoided. And the vast majority of memory accesses for each program are directed to the certain pre-defined memory regions as well as to the stack and thread local storage.

Figure 6A:
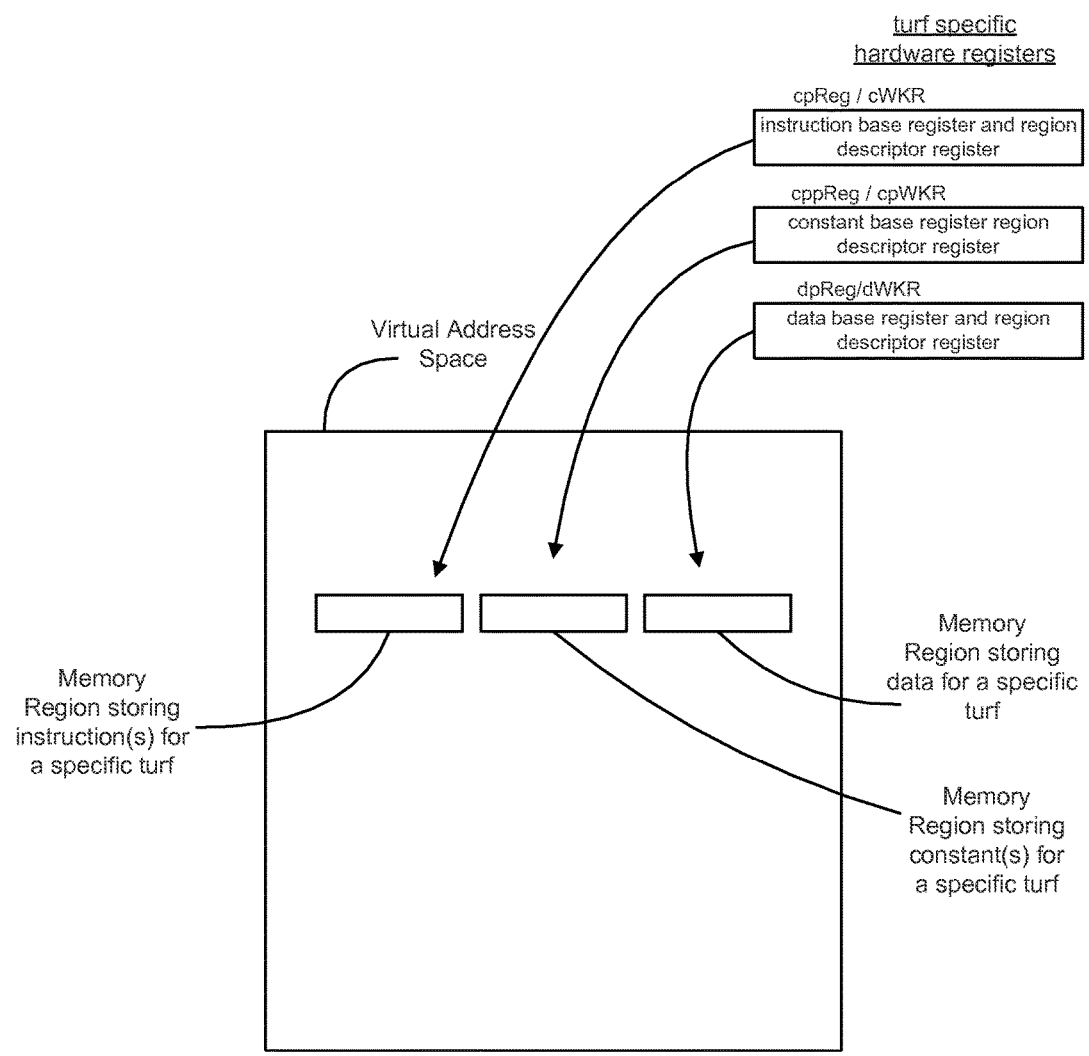
FIG. 6A is schematic illustration of hardware registers storing turf-specific descriptors that are used by the computer processor of FIG. 1 to define and enforce protection domains for threads executing on the computer processor.

For this reason, each executing thread can have access to a set of turf-specific hardware registers for the turf ID that it is executing in. Such turf-specific hardware registers store state information for the given turf. Such turf-specific state information can include a set of addresses and corresponding descriptors (referred to herein as "well-known region descriptors") that pertain to different regions of the virtual address space that are commonly accessed by a thread executing in the given turf. The addresses define base addresses that are used to derive effective addresses into the turf-specific regions. The descriptors define address ranges for the turf-specific regions with implicit permissions for such turf-specific regions. An example of such turf-specific hardware registers is shown in FIG. 6A, which includes the following:

- a register "cpReg" that stores data representing a base address for a memory region in the virtual address space of the memory system that holds binary instructions (code) for the turf;
- a register "cWKR" that stores data representing an address range for the memory region in the virtual address space of the memory system that holds the binary instructions (code) for the turf;
- a register "cppReg" that stores data representing a base address for a memory region in the virtual address space of the memory system that stores constants for the turf;
- register "cpWKR" that stores data representing an address range for the memory region in the virtual address space of the memory system that stores constants for the turf;
- a register "dpReg" that stores data representing a base address for a memory region in the virtual address space of the memory system that holds operand data for the turf and
- a register "dWKR" that stores data representing an address range for the memory region in the virtual address space of the memory system that holds operand data for the turf.

These memory regions can be specified by the program loader of the operating system. Note that the turf-specific registers can be accessed by the corresponding executing thread for protection checking such that these memory regions can be accessed securely without checking the iPLB and/or the dPLB and thus avoids the computational resources and power in checking the iPLB and/or the dPLB.

The CPU hardware can also include thread-turf specific hardware registers that store a set of stack addresses and corresponding descriptors that pertain to the stacklet of each given thread-turf combination executing on the CPU. The stack addresses can include an "FP" pointer that points to the top stack frame in the stacklet, and "SP" pointer that points to the end of the top stack frame in the stacklet. The stacklet descriptors can represent an address range that covers the stack frames of the stacklet (e.g., from the base of the stack frame to the "SP" pointer for the stacklet). The stack addresses and descriptors for the stacklet can be adjusted dynamically according to the control flow of the program as stack frames are added (due to the execution of a CALL operation in the thread-turf combination) and removed (due to the execution of a RETURN operation in the thread-turf combination).

The CPU hardware can also include thread-specific hardware registers that store a set of addresses and corresponding descriptors that pertain to thread local storage of each given thread executing on the CPU. The addresses can include a pointer that points to the thread local storage of the given thread. The descriptors can represent an address range for the thread local storage of the given thread.

Figure 6B:
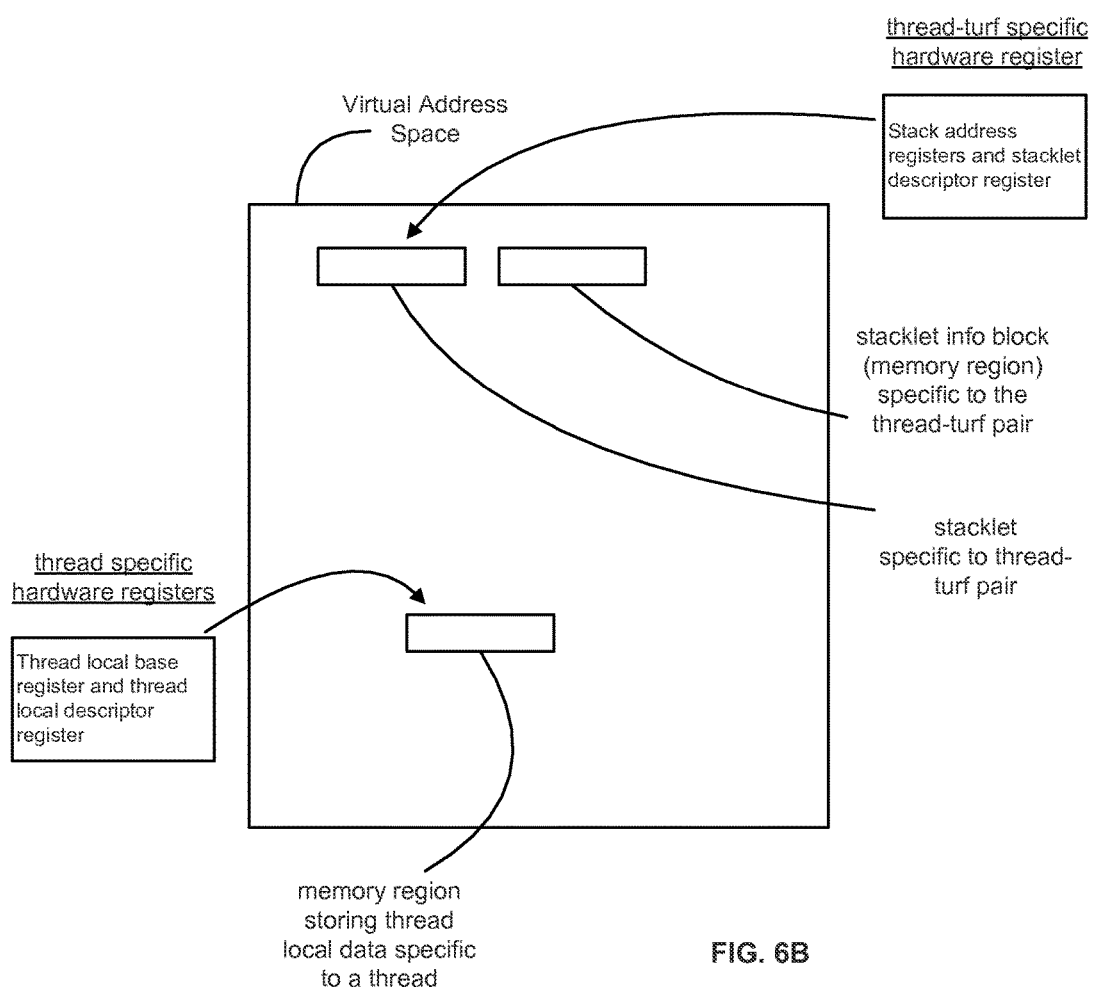
FIG. 6B is schematic illustration of hardware registers storing thread-turf-specific descriptors and thread-specific descriptors that are used by the computer processor of FIG. 1 to define and enforce protection domains for threads executing on the computer processor.

An example of such thread-turf specific hardware registers and thread-specific hardware registers is shown in FIG. 6B. These hardware registers can be used for protection checking such that the stacklet frames and/or thread local storage that corresponds to an executing thread and turf pair can be accessed securely without involving checking the iPLB and/or the dPLB. This avoids using the protection domains defined by the iPLB and/or the dPLB to protect the stacklet frames and thread local storage of the functions and services of the program from each other and thus avoids the computational resources and power in checking the iPLB and/or the dPLB. Note that it is possible for one thread-turf combination (which is referred to as "thread-turf A") to access the stack frame(s) of another thread-turf combination (which is referred to as "thread-turf B"), and the thread-turf specific hardware registers for thread-turf A will not permit access to the stack frame(s) for thread-turf B. Consequently, the iPLB and/or dPLB and/or Region Table of the CPU can include region descriptors that cover the stack frame(s) of thread-turf B with appropriate permissions for access by thread-turf A. In this case, the querying of the iPLB and/or dPLB and/or Region Table will permit the thread-turf A to access the stack frame(s) of thread-turf B when deemed appropriate by the permissions. It is also possible for one thread (which is referred to as "thread A") to access the thread local storage of another thread (which is referred to as "thread B"), and the thread specific hardware registers for thread A will not permit access to the thread local storage for thread B. Consequently, the iPLB and/or dPLB and/or Region Table of the CPU can include region descriptors that cover the thread local storage of thread B with appropriate permissions for access by thread A. In this case, the querying of the iPLB and/or dPLB and/or Region Table will permit thread A to access the thread local storage of thread B when deemed appropriate by the permissions.

Figure 6C:
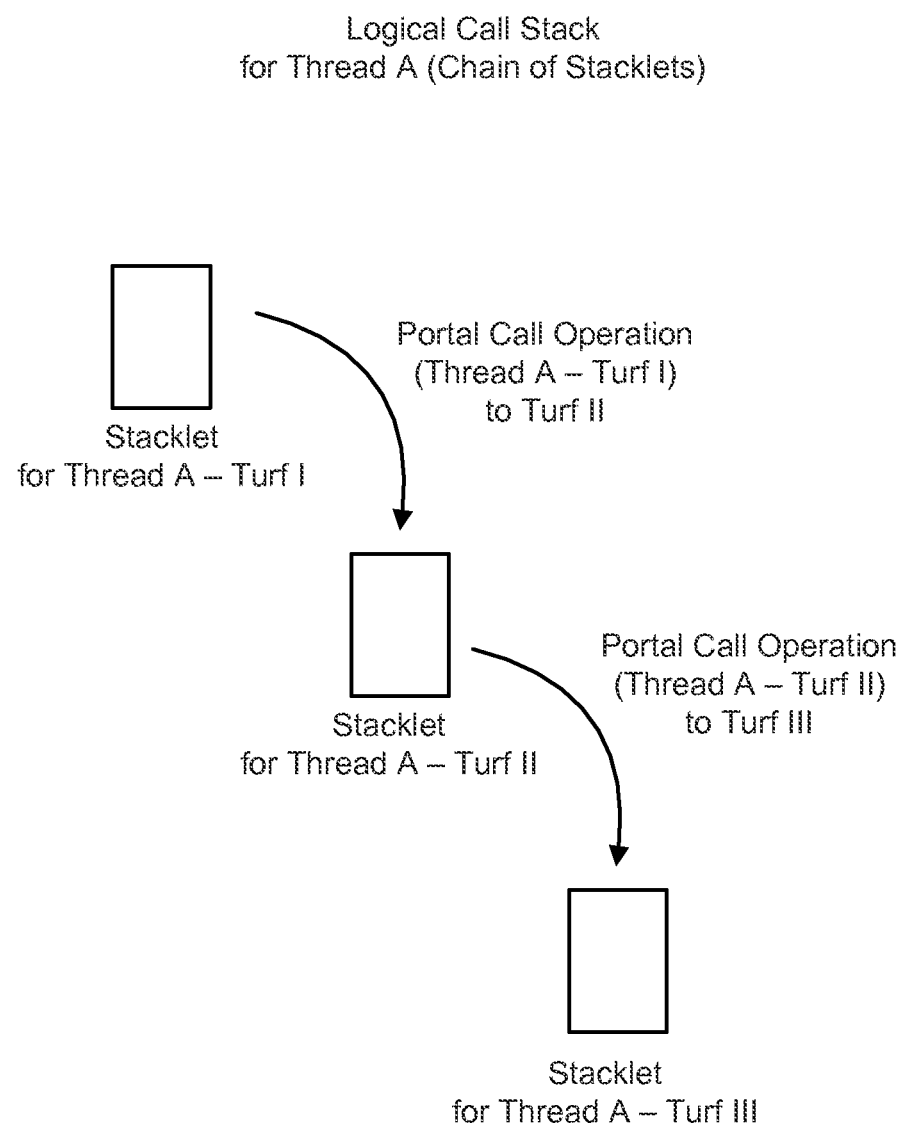
FIG. 6C is pictorial illustration of a logical call stack for a thread executing on the computer processor of FIG. 1.

Each thread and turf combination has its own stacklet stored in the virtual address space of the memory system. When the execution of a thread moves to a different turf (for example, by the processing of a portal-type CALL operation as described herein), the whole logical stack for a given thread is a chain of stacklets as shown in FIG. 6C. Each stacklet can have its own protection domain, because the stacklets corresponds to different turfs that can be isolated from each other. No extra dPLB or iPLB entries are needed to enforce these security measures. Note that chain of stacklets for the given thread partitions or segments the whole logical stack for the given thread. The stacklets, which are segments of the logical stack for the given thread, can be chained on a list. In the event that bottom stack frame of a current stacklet exits, the top stack frame of the next stacklet down the list can be unwound.

Figure 8A:
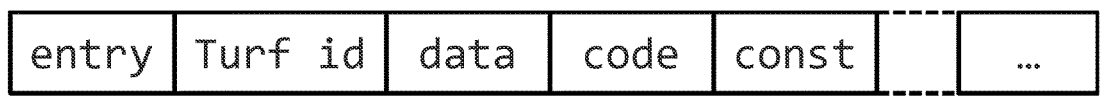
FIG. 8A is an illustration of the layout of a portal entry according to an embodiment of the present disclosure.
Figure 8B:
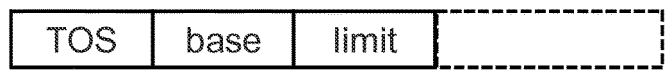
FIG. 8B is an illustration of the information contained in a stacklet info block according to an embodiment of the present disclosure.

The memory system can also store an info block per stacklet (which is referred to herein as a "stacklet info block"), which is used preserve the stack state of each thread on each turf in each stacklet. An example of a stacklet info block is shown in FIG. 6B. In one embodiment, each stacklet info block can be a single cache line in size and contain data pointing to the top of stacklet, the base of the stacklet, and the limit of the stacklet as shown in FIG. 8B.

The stacklets can be automatically allocated by hardware. In one embodiment, the upper part of the virtual address space of the memory system of the CPU can be reserved for stacklets and can be organized as a two-dimensional array indexed by thread ID and turf ID. The CPU hardware can compute the address of a stacklet trivially. How large stacklets are and how many turfs and threads are available and how much of the virtual address space they hold overall is implementation specific. In one example, an implementation that allows 1 million turfs and 1 million threads with stacklets of 8 Kbytes in size can reserve the upper 8 GB of the virtual address space of the memory system of the CPU as the two dimensional array of stacklets.

The stacklet info blocks can also be automatically allocated by hardware. In one embodiment, the virtual address space of the memory system of the CPU that is reserved for stacklet info blocks can be a reserved address space indexed with turf ID and thread ID. Uninitialized stacklet info blocks (as well as all uninitialized memory) can be implicitly assigned to zero as described in U.S. patent application Ser. No. 14/515,231, filed on Oct. 15, 2014, and herein incorporated by reference in its entirety. As such, the stacklet info blocks are automatically initialized to the default state of an empty stacklet.

Each thread executing on the CPU can also have access to its own local thread memory block as part of the virtual address space of the memory system of the CPU. This local thread memory block can be used to store local operand data that is generated and/or consumed by an executing thread. Each thread local memory block can have its own protection domain, because the thread local memory blocks corresponds to different turfs that can be isolated from each other.

Figure 7:
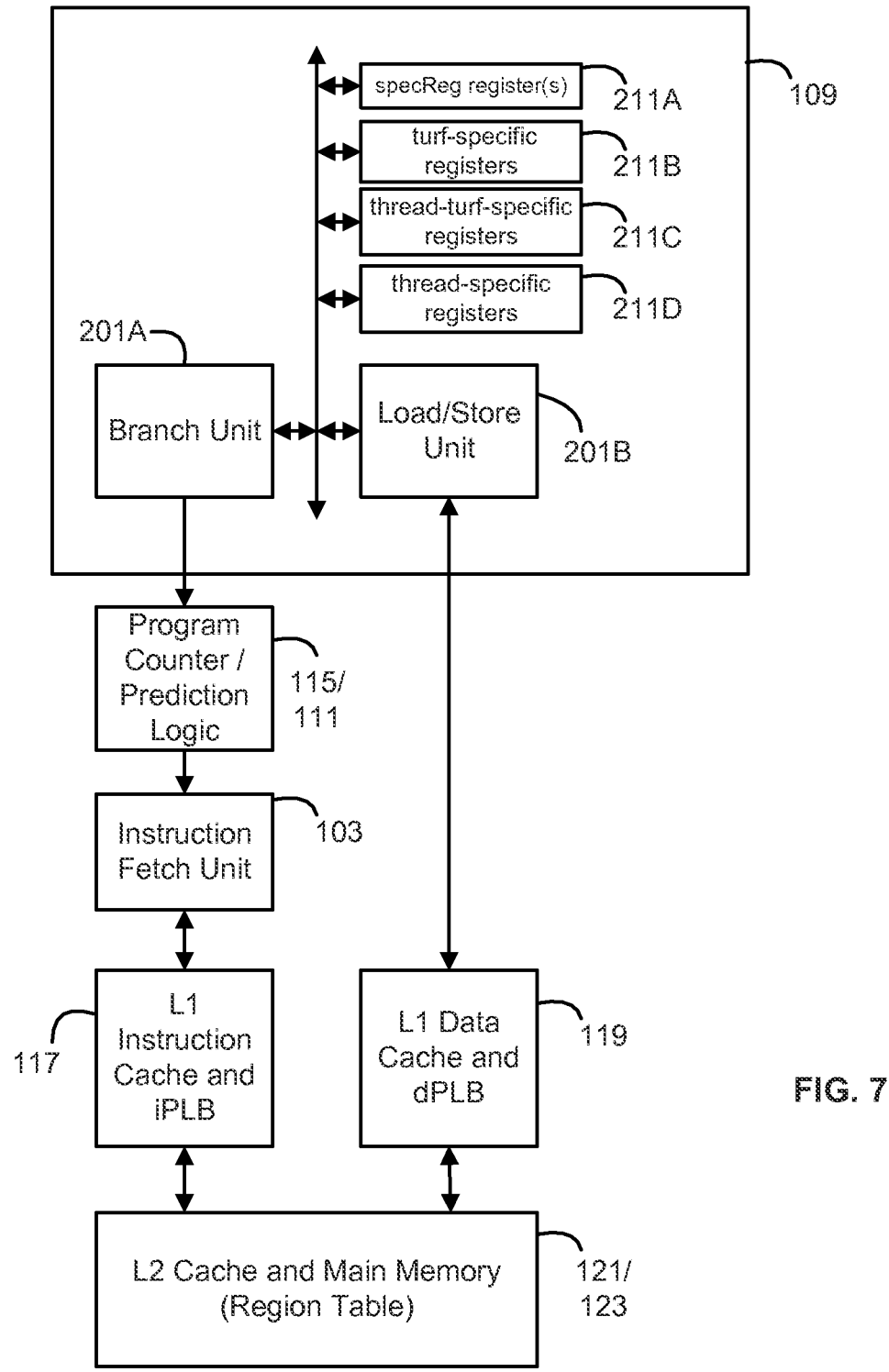
FIG. 7 is a schematic block diagram of components that can be part of the execution/retire logic of the computer processor of FIG. 1 according to an embodiment of the present disclosure.

In one embodiment shown in FIG. 7, the Execution/Retire Logic 109 of the CPU includes at least one functional unit 201A (one shown and labeled "Branch Unit") that is configured to perform actions for control flow operations (such as conditional and unconditional BRANCH operations, conditional and unconditional CALL operations and conditional and unconditional RETURN operations) as well as at least one functional unit 201B (one shown and labeled "Load/Store Unit") that is configured to perform actions that load operand data from or store operand data to the memory system of the CPU (such as LOAD and STORE operations). The functional units 201A and 201B interface to hardware registers 211A, 211B, 211C and 211D as shown. The hardware registers 221A are the specReg registers that stores the thread ID and turf ID pair(s) for the thread(s) executing on the CPU. The hardware registers 211B are turf-specific registers (e.g., cpReg, cWKR, cppReg, cpWKR, dpReg, dWKR Registers) that stores the turf-specific state information for thread-turf pair(s) executing on the CPU. The hardware registers 211C are thread-turf-specific registers that stores the thread-turf-specific state information (e.g., stacklet addresses and stack frame descriptors) for thread-turf pair(s) executing on the CPU. The hardware registers 211D are thread-specific registers that stores the thread-specific information (e.g., thread local storage addresses and descriptors) for thread-turf pair(s) executing on the CPU.

During the execution of a control flow operation by a given thread-turf pair, the Branch Unit 201A can access the base address "cpReg" register of the turf-specific registers 211B for the given thread-turf pair (and/or possibly one or more other supported address registers for the given thread-turf pair) to generate the target address of the control flow operation and then access the well-known region descriptors stored in the turf-specific registers 211B for the given thread-turf pair (e.g., the well-known region descriptor of the memory region storing instructions (code) for the particular turf of the thread-turf pair) to determine if the memory region(s) pointed to by such descriptors (which are inherently accessible by the given thread-turf pair) cover the target address of the control flow operation. This condition can be determined by comparing the virtual address range for the cache line referenced by the target address to the virtual address range for the memory region(s) pointed to by such well-known region descriptors to ascertain whether the virtual address range for the cache line referenced by the target address lies within the virtual address range for the memory region(s) pointed to by such well-known region descriptors. If so, the transfer of control flow to the target address is performed without checking the iPLB and/or the dPLB and thus avoids the computational resources and power in checking the iPLB and/or the dPLB. This transfer of control flow can involve the cooperation of the Program Counter 115 and Prediction Logic 111 to issue a fetch request to the L1 Instruction Cache 117 to fetch the cache line referenced by the target address. In this case, protection checking by the iPLB (and the dPLB) is avoided.

In the event that the memory region(s) pointed to by the well-known region descriptors stored in the turf-specific registers 211B for the given thread-turf pair do not cover the target address of the control flow operation, the Branch Unit 201A can cooperate with the Program Counter 115 and Prediction Logic 111 to issue a fetch request to the L1 Instruction Cache 117 to fetch the cache line referenced by the target address. In this case, protection checking by the iPLB is performed to ascertain whether the instruction-type region descriptors stored by the entries of the iPLB (which can possibly be hoisted from the Region Table if missed in the iPLB) dictate that access to the referenced cache line should be granted or denied for the given thread-turf pair. If such processing indicates that access should be granted, the transfer of control flow to the target address is performed. If such processing indicates that access should be denied, a protection violation is detected and a fault or other error is raised by the CPU.

During the execution of a LOAD or STORE operation by a given thread-turf pair, the Load/Store Unit 201B can access the base address "dpReg" register of the turf-specific registers 211B for the given thread-turf pair (and/or possibly one or more other supported address registers for the given thread-turf pair) to generate the target address of the LOAD or STORE operation and then can access the well-known region descriptors stored in the turf-specific hardware registers 211B for the given thread-turf pair (e.g., the well-known region descriptors of the memory regions storing data and constants for the particular turf of the thread-turf pair) as well as the descriptors describing the stacklet for the given thread-turf pair as stored in the thread-turf-specific registers 211C as well as the descriptors describing the thread local storage of the thread of the given thread-turf pair as stored in the thread-specific registers 211D to determine if the memory region(s) pointed to by such descriptors (which are inherently accessible by the given thread-turf pair) cover the effective address of the LOAD or STORE operation. This condition can be determined by comparing the virtual address range for the cache line referenced by the effective address to the virtual address range for the memory region(s) pointed to by such descriptors to ascertain whether the virtual address range for the cache line referenced by the effective address lies within the virtual address range for the memory region(s) pointed to by such descriptors. If so, the LOAD or STORE operation is performed without checking the iPLB and/or the dPLB and thus avoids the computational resources and power in checking the iPLB and/or the dPLB.

In the event that the memory region(s) pointed to by the descriptors stored in the turf-specific registers 211B, the thread-turf specific registers 211C and the thread-specific registers 211D for the given thread-turf pair do not cover the effective address of the LOAD or STORE operation, the Load/Store Unit 201B can issue a memory request to the L1 Data Cache 119 to fetch the cache line referenced by the effective address of the LOAD or STORE operation. In this case, protection checking by the dPLB is performed to ascertain whether the data-type region descriptors stored by the entries of the dPLB (which can possibly be hoisted from the Region Table if missed in the dPLB) dictate that access to the referenced cache line should be granted or denied for the given thread-turf pair. If such processing indicates that access should be granted, the actions of the LOAD or STORE operation are completed. If such processing indicates that access should be denied, a protection violation is detected and a fault or other error is raised by the CPU.

The CPU hardware can utilize certain entries (referred to herein as "portal entries) that are stored in the hierarchical memory system and accessed by an executing thread to call or invoke functions or services. Such functions or services can execute in a different protection domain without switching threads. Each portal entry includes a set of data elements that can be accessed by an executing thread to call (or invoke) a particular function or service. These data elements include the following:

first data representing an entry address used to start the processing (e.g., fetch, decode, issue, execute, retire) of the instruction(s) of the particular function or service;

second data that identifies a turf associated with the particular function or service; and third data representing state information specific to the turf associated with the particular function or service (for example, such state information can be the turf-specific descriptors for the turf associated with the particular function or service that are stored in the turf-specific hardware registers as described above with respect to FIG. 6A).

The data elements of the portal entry can be arranged in a pre-defined layout as stored in the memory system. An example of such a layout is shown in FIG. 8A. The memory region(s) of the virtual address space of the memory system of the CPU that store a given portal entry can have a predefined permission parameter (which is referred to as "portal" permission) that permits the memory region to store a valid portal entry.

The function or service associated with a given portal entry can provide secure, stateful, callable behavior. The secure nature of the function or service can be provided by the separate and distinct protection domains for the Caller (the program code of a thread that called or invoked the function or service) and for the Callee function or service itself (which executes as part of the same thread of the Caller). This means that the Caller while executing in its own protection domain cannot directly access and tromp on the state and variables of the Callee function or service, and that the Callee function or service itself while executing in its own protection domain cannot directly access and tromp on the state and variables of the Caller. The stateful nature of the function or service can be provided by maintaining data structures representing the execution state (e.g., such as variables and other parameters) of the function or service as the function or service executes. Note that the execution of the function or service can continue in the same thread as that of the Caller while the execution of the Caller is inactive and does not execute. The callable nature of the function or service is provided by the portal-type CALL operation, which allows the function or service to be invoked by the execution of a CALL operation that does not require a task switch involving a change in threads.

The processing of a portal entry is triggered by the execution of a CALL operation with an address argument that represents a pointer referring to the portal entry. This is referred to as a portal-type CALL operation. Alternatively, the address argument(s) of the CALL operation can specify the entry address of a function (referred to herein as a "Callee function") that executes within the same thread and same protection domain as that of the CALL operation. This is referred to as a normal-type CALL operation.

The processing of both portal-type and normal-type CALL operations is described below with reference to the flowchart of FIGS. 9A and 9B. For the portal-type CALL operation, the address argument is a pointer to a portal entry in the virtual address space of the memory system. For the given thread-turf pair, the range of valid addresses referenced by the address argument (pointer) for portal-type CALL operations is constrained by the protection domain for the given thread-turf pair. This protection domain can include one or more memory regions described by the region descriptors of the iPLB (and Region Table) that are associated with the thread-turf pair and have "portal" permission. For normal-type CALL operations, the address argument(s) can specify an absolute address or offset address (such as base+index, base+index+offset or other offset addressing schemes) in the virtual memory space of the memory system. For a given thread-turf pair, the range of valid addresses referenced by the address argument(s) for normal-type CALL operations is also constrained by the protection domain for the given thread-turf pair. This protection domain can include two parts: i) a memory region storing instructions (code) for the thread-turf pair (which is pointed to by well-known region descriptors for the thread-turf pair) and ii) zero or more memory regions described by the instruction-type region descriptors of the iPLB (and Region Table) that are associated with the thread-turf pair and have "execute" permission.

In block 901, the functional unit executing the CALL operation (e.g., the Branch Unit 201A of FIG. 7) evaluates the address argument(s) of the CALL operation to derive an effective virtual address for the CALL operation. The base address "cpReg" register of the turf-specific registers 211B for the given thread-turf pair (and/or possibly one or more other supported address registers for the given thread-turf pair) can be accessed to generate the effective virtual address for the CALL operation where the address argument of the CALL operation is an address that is offset from the base address stored in the "cpReg" register. It is also possible that the effective virtual address for the CALL operation can be generated without access to the base address stored in the "cpReg" register (and/or without access to other supported address registers for the given thread-turf pair) where self-relative addressing is used.

In block 903, the Branch Unit (or other CPU hardware) accesses the hardware register(s) 211B storing the well-known region descriptors pointing to the memory region storing instructions (code) for the thread ID-turf ID pair at the time of the CALL operation.

In block 905, the Branch Unit (or other CPU hardware) checks whether the memory region storing instructions (code) for the turf ID-thread ID pair (as dictated by the well-known region descriptors accessed in block 903) cover the effective virtual address resulting from the evaluation of the address argument(s) in block 901. This condition can be determined by comparing the virtual address range for the cache line referenced by the effective virtual address derived from the address argument(s) in block 901 to the virtual address range for the memory region(s) pointed to by such well-known region descriptors to ascertain whether the virtual address range for the referenced cache line lies within the virtual address range for the memory region(s) pointed to by such well-known region descriptors. If the check of block 905 passes, the operations continue to block 907; otherwise, the operations continue to block 909.

In block 907, the CALL operation is processed as a normal-type CALL operation (and not a portal-type CALL operation) because only normal-type CALL operations (and not portal-type CALL operations) can specify a target address within the well-known memory region storing instructions (code) for the turf of the thread-turf pair. Specifically, the Branch Unit uses the effective virtual address resulting from the evaluation of the address argument(s) in block 901 to update the Program Counter 115. If the instruction portion referenced by this effective virtual address is not already stored in the Instruction Buffer 105, the Instruction Fetch Unit 103 can be controlled to issue a fetch request to the L1 Instruction Cache 117 for the instruction portion referenced by this effective virtual address without protection checking by the iPLB, which avoids the computational resources and power in checking the iPLB. In one embodiment, the Instruction Fetch Unit 103 is controlled to fetch a cache line at the virtual address referenced by the address argument(s) of the CALL operation. For the normal-type CALL operation, this cache line stores code of a Callee function that executes in the same thread and protection domain as that of the call site. In this manner, these actions initiate transfer of control to the Callee function that executes within the same thread and same protection domain as that of the call site (normal-type CALL operation). Such transfer of control can also involve updating (e.g., elevating) the quality information for a predictor entry corresponding to the particular normal-type CALL operation where the particular normal-type CALL operation was predicted to be taken and then processed (e.g., fetch, decode, issue and execution) by speculation. Such transfer of control can also involve detecting and recovering from a mispredict where the particular normal-type CALL operation was predicted to be not taken. In this case, the mispredict recovery can initiate the processing (e.g., fetch, decode, issue and execution) of the instruction(s) of the Callee function and update (lower) the quality information for a predictor entry corresponding to the particular normal-type CALL operation.

In block 909, the Branch Unit uses the effective virtual address resulting from the evaluation of the address argument(s) in block 901 to update the Program Counter 115. If the instruction portion referenced by this effective virtual address is not already stored in the Instruction Buffer 105, the Instruction Fetch Unit 103 can be controlled to issue a fetch request to the L1 Instruction Cache 117 for the instruction portion referenced by this effective virtual address in conjunction with protection checking by the iPLB (blocks 911 to 921).

In block 911, the iPLB hardware accesses and queries (looks-up) the entries of iPLB to identify one or more instruction-type region descriptors stored in the iPLB (or possibly stored in the Region Table if missed in the iPLB) where such one or more instruction-type region descriptors have i) a thread ID-turf ID pair that matches the thread ID-turf-ID pair at the time of the CALL operation and ii) data that specifies a memory region that covers the virtual address resulting from the evaluation of the address argument(s) of the CALL operation in block 901. This second condition ii) can be determined by comparing the virtual address range for the cache line referenced by the effective virtual address derived from the address argument(s) in block 901 to the virtual address range for the memory region(s) specified by the matching instruction-type region descriptors to ascertain whether the virtual address range for the referenced cache line lies within the virtual address range for the memory region(s) pointed to by the matching instruction-type region descriptors.

In block 913, the iPLB hardware processes the permission parameters for the matching instruction-type region descriptor(s) identified in block 911 to determine if such permission parameters specify an "execute" permission throughout.

In block 915, iPLB hardware checks that the permission parameters processed in block 913 specify an "execute" permission throughout. If this check passes, the operations continue to block 917; otherwise, the operations continue to block 919.

In block 917, the CALL operation is processed as a normal-type CALL operation (and not a portal-type CALL operation) because only normal-type CALL operations (and not portal-type CALL operations) can have target addresses in a memory region described by a region descriptor with "execute" permission. Specifically, the iPLB hardware grants permission for completion of the fetch request initiated in block 909, which corresponds to the target address of the Callee function. These actions initiate transfer of control to the Callee function that executes within the same thread and same protection domain as that of the call site (normal-type CALL operation) and the operations end.

In block 919, the iPLB hardware further processes the permission parameters for the matching instruction-type region descriptor(s) identified in block 911 to determine if such permission parameters specify a "portal" permission that permits the memory region to store a valid portal entry.

In block 921, iPLB hardware checks that the permission parameters processed in block 919 specify a "portal" permission. If this check passes, the operations continue to block 923; otherwise, the operations continue to block 925.

In block 923, the CALL operation is processed as a portal-type CALL operation (and not a normal-type CALL operation) because only portal-type CALL operations (and not normal-type CALL operations) can have target addresses in a memory region described by a region descriptor with "portal" permission. Specifically, the iPLB hardware grants permission for completion of the fetch request initiated in block 909, which corresponds to the virtual address for the portal entry that is further processed to call (or invoke) a particular function or service and thus transfer of control to the particular function or service. Such transfer of control can involve detecting and recovering from a mispredict where the particular portal-type CALL operation was predicted to be not taken. In this case, the mispredict recovery can initiate the processing (e.g., fetch and subsequent processing) of the portal entry for the particular portal-type CALL operation as described below.

In block 925, the target address of the CALL operation falls outside the protection domain of the thread-turf pair. In this case, the iPLB hardware denies permission for completion of the fetch request initiated in block 909 (which can prohibit the requested cache line from being stored into the Instruction Buffer 105) and raises a fault or triggers other suitable error handling as desired and the processing ends.

Figure 9A:
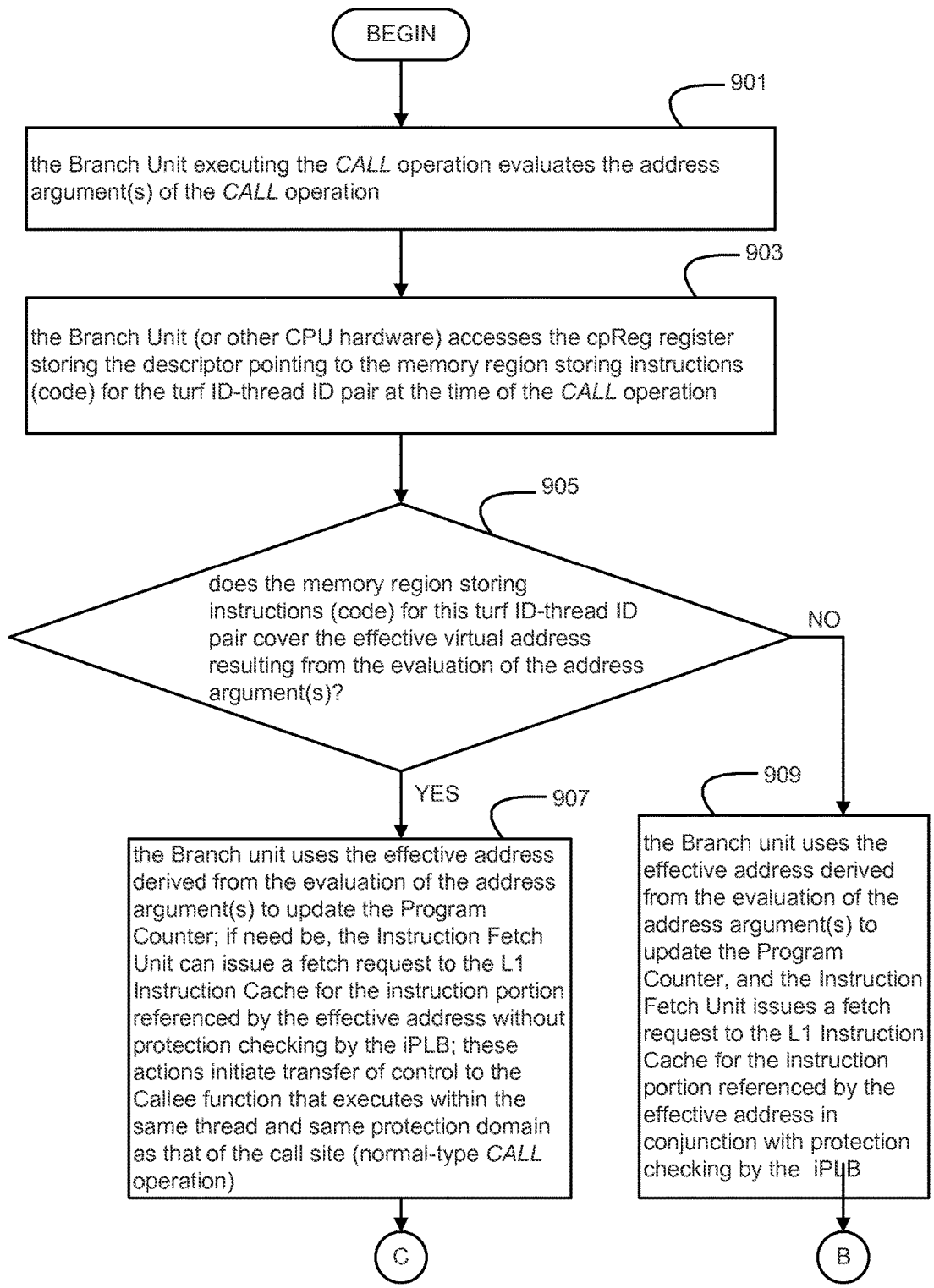
FIGS. 9A and 9B, collectively, is a flowchart illustrating the operations carried out by the computer processor in processing CALL operations, which includes normal-type CALL operations and portal-type CALL operations according to an embodiment of the present disclosure.
Figure 9B:
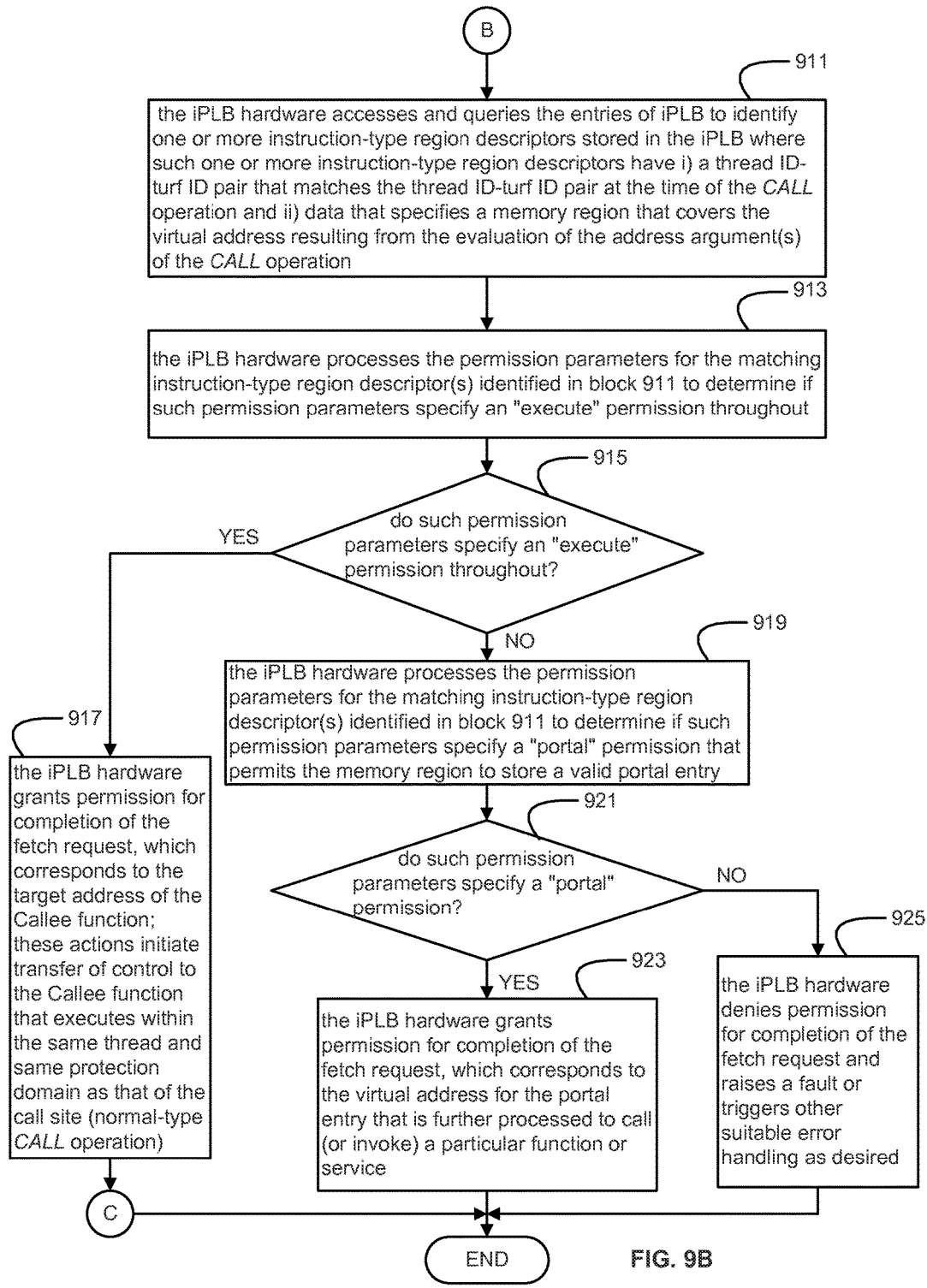
Figure 10:
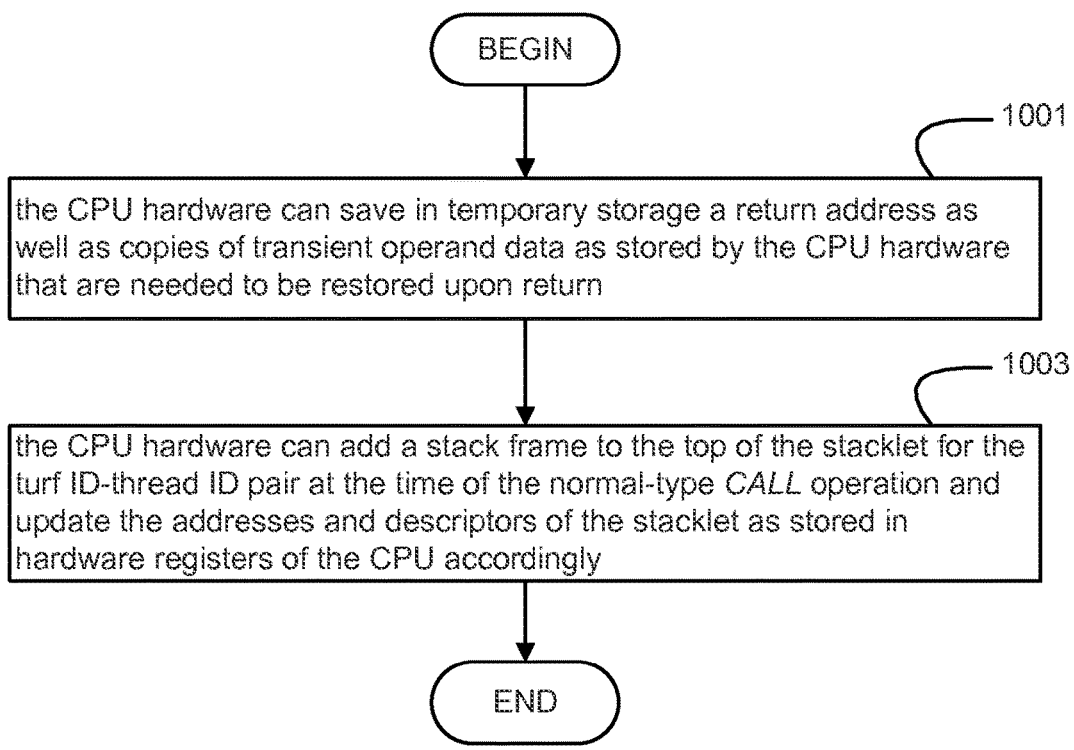
FIG. 10 is a flowchart illustrating actions carried out by the computer processor in processing a normal-type CALL operation.

FIG. 10 illustrates actions that can be performed by the CPU hardware for the case of a normal-type CALL operation (blocks 907 of FIG. 9A or block 917 of FIG. 9B). In block 1001, the CPU hardware can save in temporary storage a return address as well as copies of transient operand data as stored by the CPU hardware that are needed to be restored upon return. In one embodiment, the return address and transient operand data can be saved by an asynchronous hardware engine (referred to a "Spiller") as described in U.S. patent application Ser. No. 14/311,988, filed on Jun. 23, 2014 and herein incorporated by reference in its entirety. The Spiller can save such information in temporary storage that is separate and distinct from the stacklet for the turf ID-thread ID pair. Note that the storage of the return address in temporary storage that is separate and distinct from the stacklet can thwart return-oriented security exploits that are common sources of security violations in modern computer systems. Also note that in this case the Callee function executes within the same thread and turf as the Caller function and thus shares the same well-known region descriptors specific to this thread ID-turf ID pair. For this reason, the well-known region descriptors of the Caller function can be used for execution of the Callee function and there need not be any actions that involve switching protection domains between the Caller function and the Callee function.

In block 1003, the CPU hardware can add a stack frame to the top of the stacklet for the thread ID-turf ID pair as stored in the specReg register of the CPU at the time of the normal-type CALL operation. The CPU hardware can initialize every new stack frame to zero. The memory address for the top of the stacklet can be referenced by accessing the stacklet descriptor information stored in registers of the CPU. The stacklet descriptor information can loaded from the stacklet info block that corresponds to the stacklet for the thread ID-turf ID pair when beginning execution of the given thread-turf pair and updated according as the new stack frame is added to the stacklet during execution of the given thread-turf pair. The stack addresses and stacklet can include data used by the Callee function (such as descriptors for arguments passed to the Callee function as well as constants and variables used in the execution of the Callee function).

Figure 11:
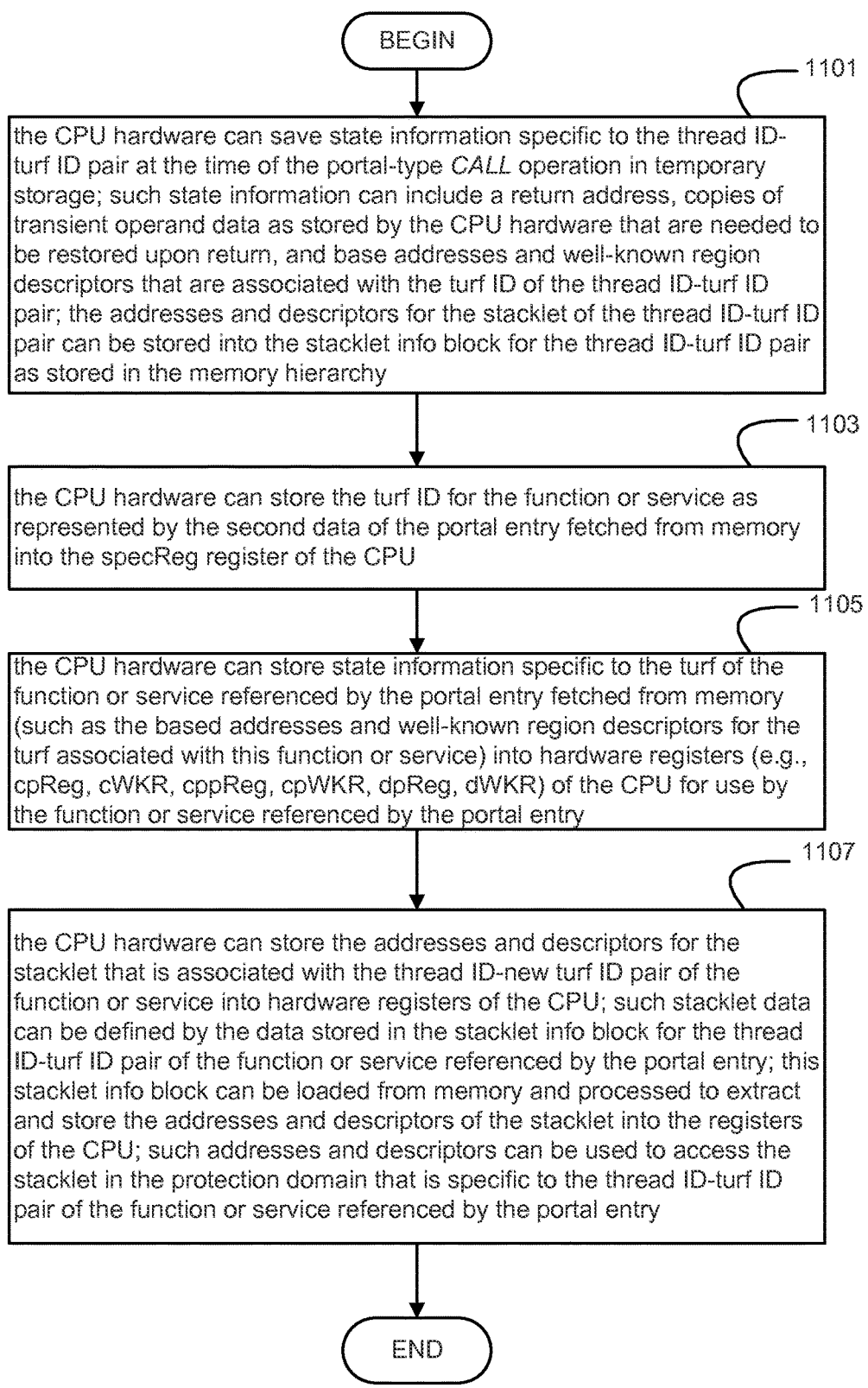
FIG. 11 is a flowchart illustrating actions carried out by the computer processor in processing a portal-type CALL operation.

For the case of a portal-type CALL operation, the CPU hardware is configured to access and process the given portal entry in order to initiate execution of the function or service referenced by the given portal entry (block 923 of FIG. 9B). In most cases (and possibly all cases), the given function or service will execute in a separate and distinct protection domain (relative to the protection domain of Caller function) as part of the same thread as the Caller function. Thus, the processing of the portal entry does not involve switching threads and avoids the computation resources required for thread/task switching. The processing of the portal entry can involve the actions described below with respect to flowchart of FIG. 11 where the portal entry acts as indirect interface mechanism to the execution of the given function or service.

In block 1101, the CPU hardware can save state information specific to the thread ID-turf ID pair at the time of the portal-type CALL operation in temporary storage. For example, such thread ID-turf ID pair specific state information can include a return address, copies of transient operand data as stored by the CPU hardware that are needed to be restored upon return, the address data and well-known region descriptors that are associated with the turf ID of the thread ID-turf ID pair. In one embodiment, such thread-turf pair specific state information can be saved by the Spiller as described in U.S. patent application Ser. No. 14/311,988, filed on Jun. 23, 2014, and incorporated by reference above in its entirety. The Spiller can save such information in temporary storage that is outside the protection domain of the function or service referenced by the portal entry and thus inaccessible by this function or service. This affords security features whereby the execution of the service or function cannot directly access and tromp on the state and variables of the Caller function. The CPU hardware can also store the stacklet descriptors that are associated with the thread ID-turf ID pair in the stacklet info block for thread ID-turf ID pair as stored in the memory system of the CPU as described herein.

In block 1103, the CPU hardware can store the turf ID for the function or service as represented by the second data of the valid portal entry into the specReg hardware register 211A of the CPU.

In block 1105, the CPU hardware can store state information specific to the turf of the function or service referenced by the portal entry (such as the base addresses and well-known region descriptors for the turf associated with this function or service) into turf-specific hardware registers 211B of the CPU for use by the function or service referenced by the portal entry. In this action, such state information specific to the turf of the function or service can be loaded from the third data of the valid portal entry as described herein.

In block 1107, the CPU hardware can store addresses and descriptors that describe the stacklet for the thread ID-new turf ID pair of the function or service into the thread-turf-specific hardware registers 211C of the CPU. In one embodiment, the stacklet addresses and descriptors can be defined by the data stored in the stacklet info block for the thread ID-turf ID pair of the function or service referenced by the portal entry. This stacklet info block can be loaded from memory and processed to extract and store the stacklet descriptors into the registers of the CPU. Such stacklet addresses and descriptors can be used by the function or service referenced by the portal entry to access the stacklet in the protection domain that is specific to the thread ID-turf ID pair of the function or service referenced by the portal entry. In this case, the CPU hardware can use the stacklet descriptors for the thread ID-new turf ID pair to add and access a new stack frame to the memory space of the stacklet for the thread ID-new turf ID pair. The CPU hardware can initialize every new stack frame to zero. The memory space for this stacklet is referenced by the stacklet addresses and descriptors for the thread ID-new turf ID pair. The stacklet addresses and descriptors can be used such that the memory region beyond the top stack frame of the stacklet is inaccessible by the executing thread in the new turf ID. These security measures can thwart exploits that access stack rubble in the region outside the stack frames for the current thread. The addresses and stacklet can include data used by the function or service (such as descriptors to arguments passed to the function or service as well as constants and variables used in the execution of the function or service).

Note that execution of a portal-type CALL operation can involve load requests for two cache lines—one cache line for the portal entry and one cache line for the stacklet info block corresponding to the portal entry.

Also note that the portal entries can rely on static assignment of one unique stacklet per thread-turf pair. Furthermore, it is possible for a single thread to include more than one portal-type CALL operation into a single function or service. For example, consider a thread executing in turf A that includes a portal-type CALL operation to turf B. These operations will involve two stacklets: one for the particular thread, turf A pair; and one for the particular thread, turf B pair. If the thread then includes a portal-type CALL operation to turf C before returning to turf A, these operations will comprise three stacklets: one for the particular thread, turf A pair; one for the particular thread, turf B pair; one for the particular thread, turf C pair. If then the thread includes a portal-type CALL operation to turf B, the recursive portal processing would attempt to again use of the stacklet for the particular thread, turf B pair, and would destroy the frames in that stacklet that are in use from the use of thread in turf B in between turfs A and C. To avoid this error each stacklet contains at its lowest address a value for the top of stacklet pointer (TOSP). This pointer indicates the first free location in the stacklet. In processing the portal-type CALL operation, the TOSP for the stacklet associated with the portal-type CALL operation (the current thread-turf pair) is updated from a hardware top of stack register of the CPU at the time of the portal-type CALL operation, and top of stack register of the CPU for the function or service is set from the TOSP in the stacklet for the thread-turf pair of the function or service. Because new frames are always allocated at the current top of stack, new frames allocated at the second or subsequent transit into the process will not overlap. In order to use the TOSP in the stacklet for the thread-turf pair of the function or service in setting the hardware top of stack register of the CPU, it must be fetched from memory by the CPU as part of the processing of the portal-type CALL operation. If there is another portal-type CALL operation to a function executing in the same thread and turf pair, then the TOSP will have been set immediately above the previous frames and using it for the stack pointer will be correct. However, if this is the first portal-type CALL operation to a function or service executing in a given thread and turf pair, then the stacklet has never been used before and the TOSP location in the stacklet is undefined. It would of course be possible for the processing of CPU to initialize a TOSP in every possible stacklet. However, the number of such stacklets can be quite large and most will never be used, which would waste the virtual memory resources of the system.

Instead, the CPU can be configured to take advantage of the hardware handling of a load-type memory request to the L1 Data Cache for a value that is undefined, i.e. to a virtual address that has never been stored to. In this case, the load-type memory request can be processed by first checking the caches for a cache line matching the virtual address, and then attempting to translate the virtual address to a corresponding physical address to probe main memory. The virtual-to-physical address translation mechanism will not find a translation page entry in the TLB nor its underlying tables, and so will report a page trap to the operating system. That page trap can be configured to recognize that the load request is a stacklet TOSP request from a portal-type CALL operation (and not an ordinary program load operation) and then respond by setting the TOSP to zero or some other fixed value in a cache line and returning that value as if the TOSP had already been initialized. That is, a load of an uninitialized TOSP causes the TOSP itself to be initialized when the load memory request fails translation in the TLB.

The execution of a RETURN operation is carried out by the Branch Unit 201A (or other CPU hardware). The actions of the RETURN operation unwinds the most recently executed CALL operation, whether it be a normal-type or portal-type CALL operation.

Figure 12:
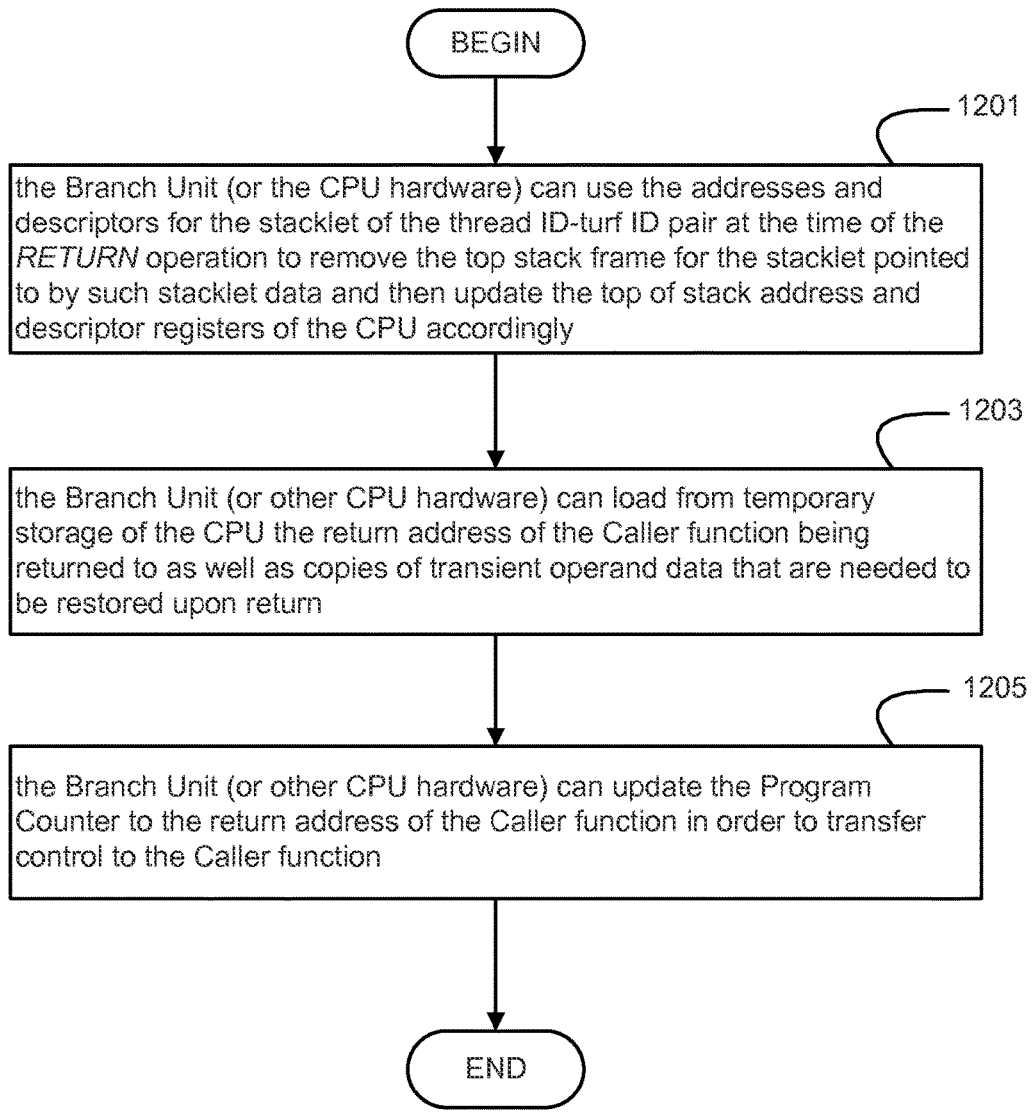
FIG. 12 is a flowchart illustrating actions carried out by the computer processor in processing a RETURN operation from a normal-type CALL operation.

For the case where the most recently executed CALL operation is a normal-type CALL operation, the RETURN operation can involve the actions as described below with respect to FIG. 12. In block 1201, the Branch Unit (or other CPU hardware) can use the state information for the thread ID-turf ID at the time of the RETURN operation (particularly, the stacklet addresses and descriptors stored in the thread-turf-specific registers 211C) to remove the top stack frame for the stacklet pointed to by such stacklet addresses and descriptors and then update the top of stack address and descriptors stored in the thread-turf-specific registers 211C of the CPU accordingly. The stacklet can also be used to pass operand data generated by the Callee function to the Caller function, if need be.

In block 1203, the Branch Unit (or other CPU hardware) can load from temporary storage of the CPU the return address of the Caller function being returned to as well as copies of transient operand data that are needed to be restored upon return. In one embodiment, such information can be loaded from temporary storage by the Spiller as described in U.S. patent application Ser. No. 14/311,988, filed on Jun. 23, 2014, and incorporated by reference above in its entirety. Note that in this case the Caller function executes within the same thread and turf as the Callee function and thus shares the same well-known region descriptors specific to this thread ID-turf ID pair. For this reason, the well-known region descriptors of the Callee function can be used for execution of the Caller function and there need not be any actions that involve switching protection domains between the Callee function and the Caller function. The transient operand data loaded from temporary storage and possibly transient operand data generated by the Callee function and being passed back to the Caller function can be stored in the operand storage elements of the CPU.

In block 1205, the Branch unit (or other CPU hardware) can update the Program Counter 115 to the return address of the Caller function in order to transfer control to the Caller function. Such transfer of control can also involve detecting and recovering from a mispredict where the RETURN operation to the Caller function was predicted to be not taken. In this case, the mispredict recovery can initiate the processing (e.g., fetch, decode, issue and execution) of the instruction(s) of the Caller function. Such transfer of control can also involve updating the quality information for a predictor entry corresponding to the RETURN operation to the Caller function where the RETURN operation to the Caller function was predicted to be taken and then processed (e.g., fetch, decode, issue and execution) by speculation.

Figure 13:
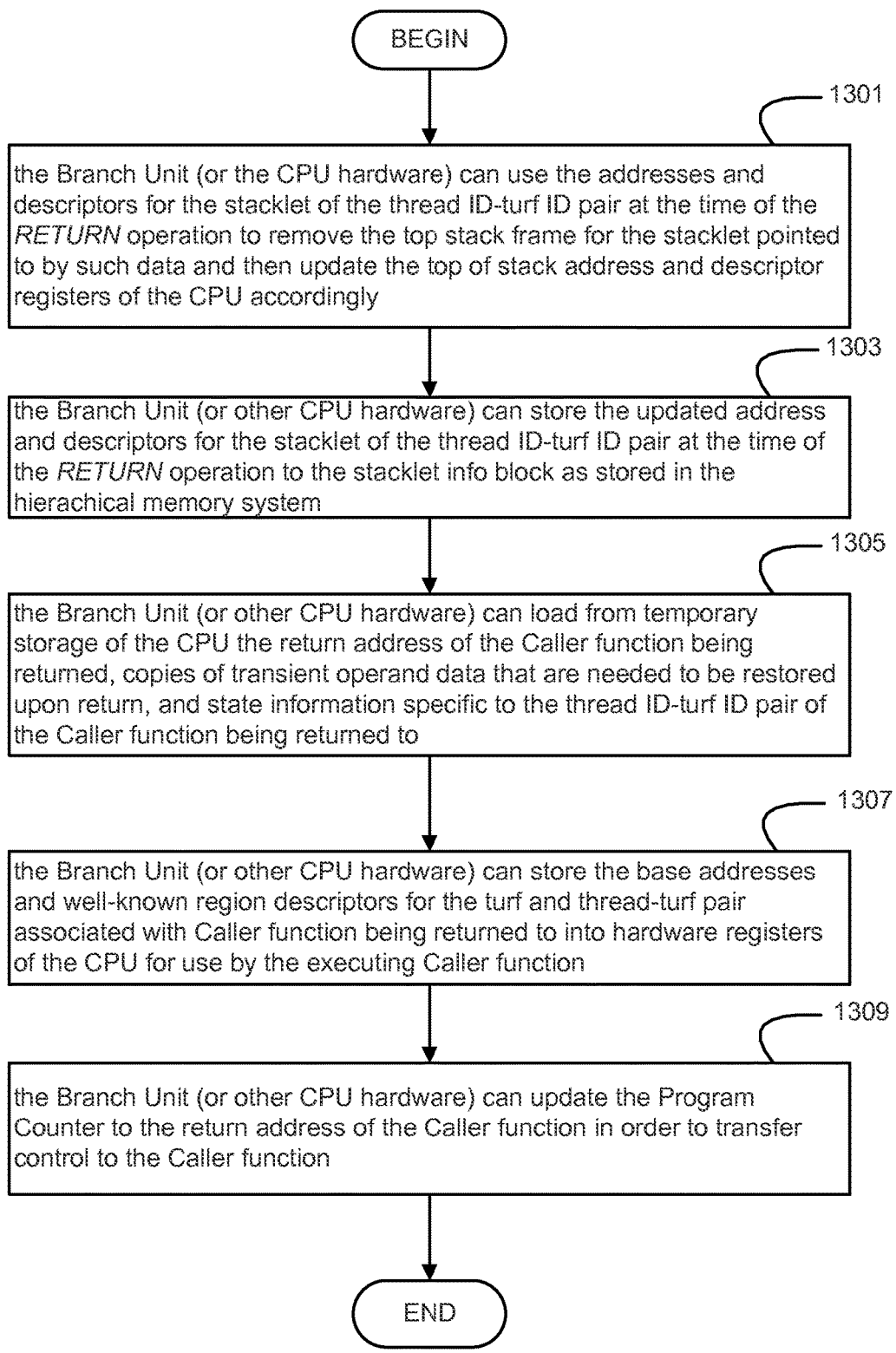
FIG. 13 is a flowchart illustrating actions carried out by the computer processor in processing a RETURN operation from a portal-type CALL operation.

For the case where the most recently executed CALL operation is a portal-type CALL operation, the RETURN operation can involve the actions as described below with respect to FIG. 13. In block 1301, the Branch unit (or other CPU hardware) can use the addresses and descriptors for the stacklet of the thread ID-turf ID pair at the time of the RETURN operation as stored in the thread-turf-specific registers 211C to remove the top stack frame for the stacklet pointed to by such stacklet addresses and descriptors and then update the top of stack address and descriptors stored in the thread-turf-specific registers 211C of the CPU accordingly. This stacklet can also be used to pass operand data generated by the Callee function to the Caller function, if need be.

In block 1303, the Branch Unit (or other CPU hardware) can store the updated stacklet descriptors for the thread ID-turf ID pair at the time of the RETURN operation to the stacklet info block as stored in the memory system.

In block 1305, the Branch Unit (or other CPU hardware) can load from temporary storage of the CPU the return address of the Caller function being returned to, copies of transient operand data that are needed to be restored upon return, and state information specific to the thread ID-turf ID pair of the Caller function being returned to. In one embodiment, such information can be loaded from temporary storage by the Spiller as described in U.S. patent application Ser. No. 14/311,988, filed on Jun. 23, 2014, and incorporated by reference above in its entirety. The thread-turf specific state information can include addresses and well-known region descriptors that are associated with the turf ID of the Caller function being returned to. The CPU hardware can also load from memory the stacklet info block for the thread ID-turf ID pair of the Caller function being returned to.

In block 1307, the Branch Unit (or other CPU hardware) can store the addresses and well-known region descriptors for the turf ID associated with the Caller function being returned to into the turf-specific hardware registers 211B of the CPU for use by the executing Caller function. Such addresses and well-known region descriptors for the turf ID of the Caller function can be defined by thread ID-turf ID pair specific state information loaded from temporary storage in block 1305. Such well-known region descriptors can be used to grant the executing Caller function access to memory regions for code, constants and data of the Caller function and thus enforce the protection domain that is specific to the thread ID-turf ID pair of the Caller function. The Branch Unit (or other CPU hardware) can also store the addresses and descriptors for the stacklet of the Caller function being returned to into the thread-turf-specific hardware registers 211C of the CPU for use by the executing Caller function. Such addresses and descriptors for the stacklet of the Caller function can be defined by the data of the stacklet info block loaded from memory in block 1305. Such stacklet descriptors can be used to grant the executing Caller function access to the stacklet and thus enforce the protection domain that is specific to the thread ID-turf ID pair of the Caller function. The transient operand data loaded from temporary storage and possibly transient operand data generated by the Callee function and being passed back to the Caller function can be stored in the operand storage elements of the CPU.

In block 1309, the Branch Unit (or other CPU hardware) can update the Program Counter 115 to the return address of the Caller function. Such transfer of control can initiate processing (fetch, decode, issue, execute, retire) of the instruction(s) of the Caller function.

The processing of the RETURN operation from the portal-type CALL operation can be constrained such that it is executed non-speculatively. This can possibly introduce a bubble in the decode stage of the CPU, which can involve a stall of a couple of machine cycles. However, speculative prefetch actions can be performed with respect to the RETURN operation in order to reduce the instruction fetch overhead of the RETURN operation, assuming the prediction for the RETURN operation was correct.

Figure 14A:
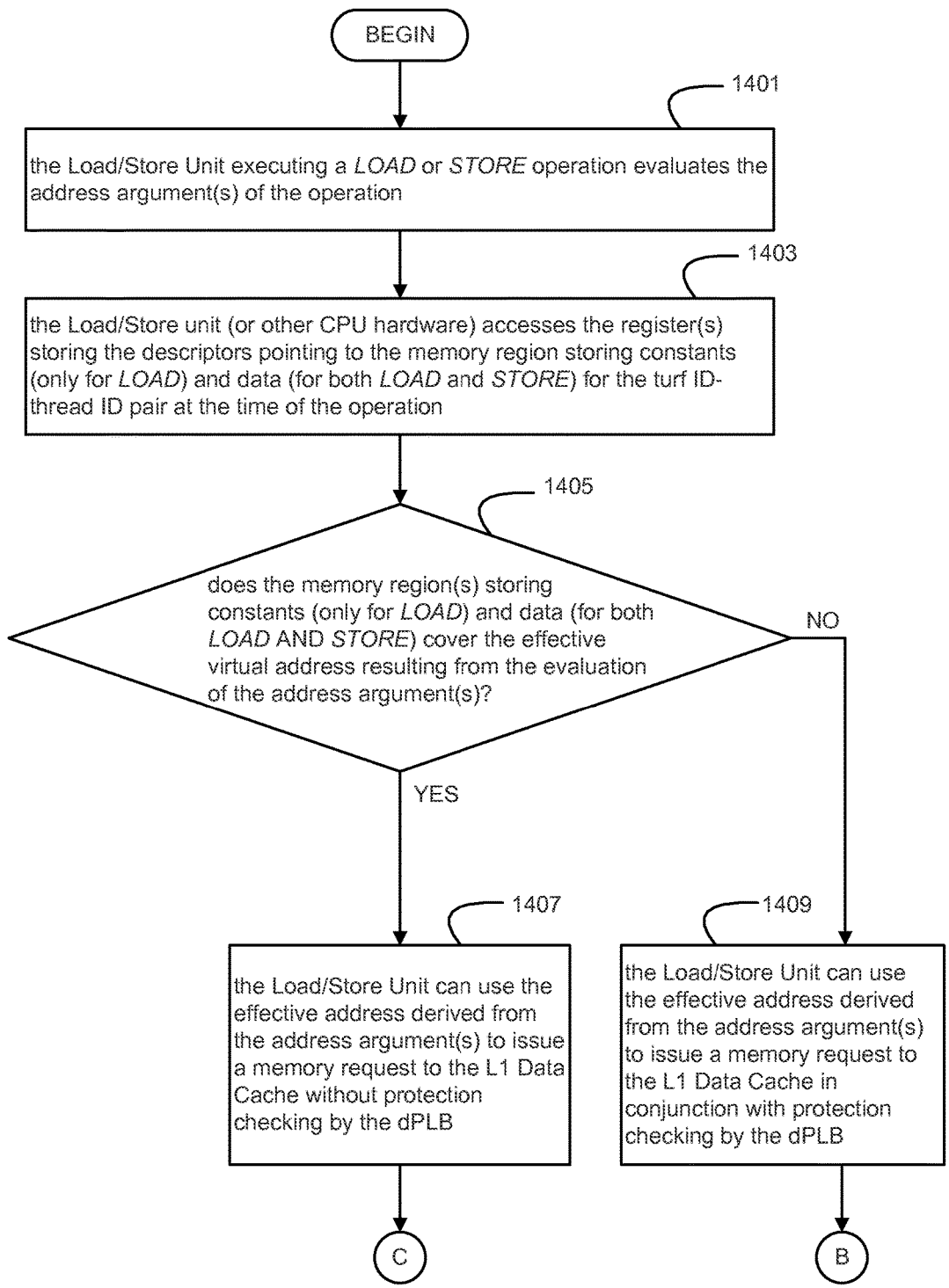
FIGS. 14A and 14B, collectively, is a flowchart illustrating the operations carried out by the computer processor in processing LOAD and STORE operations according to an embodiment of the present disclosure.
Figure 14B:
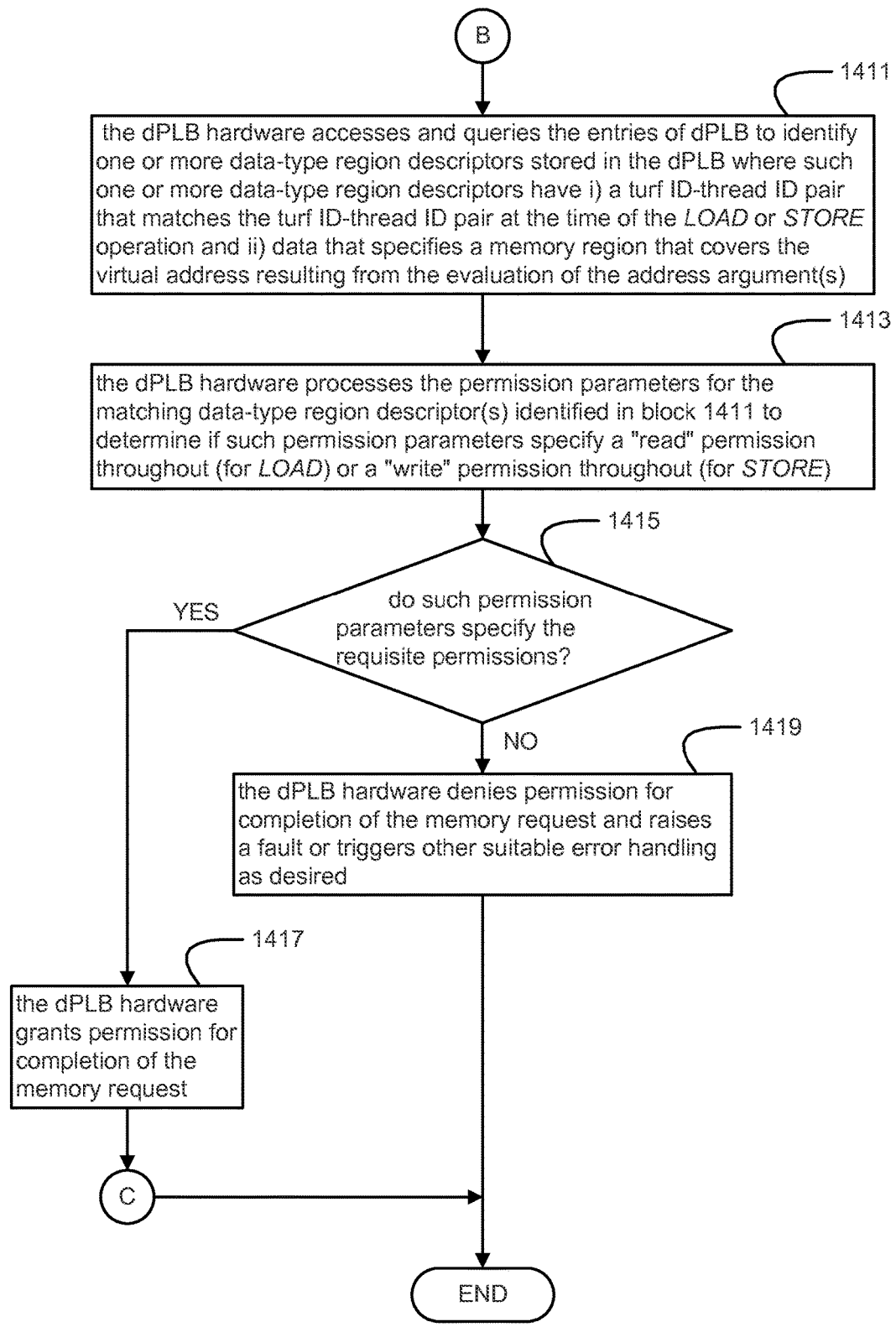

The processing of LOAD and STORE operations by the Load/Store Unit 201B is described below with reference to the flow chart of FIGS. 14A and 14B. The LOAD and STORE operations each include address argument(s) that can specify an absolute address or offset address (such as base+index, base+index+offset or other offset addressing schemes) in the virtual memory space of the memory system. For a given thread-turf pair, the range of valid addresses referenced by the address argument(s) for LOAD operations is constrained by the protection domain for the given thread-turf pair. This protection domain can include two parts: i) memory regions storing constants and data for the thread-turf pair (which is pointed to by well-known region descriptors for the thread-turf pair) and ii) zero or more memory regions described by the data-type region descriptors of the dPLB (and Region Table) that are associated with the thread-turf pair and have "read" permission. For a given thread-turf pair, the range of valid addresses referenced by the address argument(s) for STORE operations is constrained by the protection domain for the given thread-turf pair. This protection domain can include two parts: i) memory regions storing non-static data for the thread-turf pair (which is pointed to by well-known region descriptors for the thread-turf pair) and ii) zero or more memory regions described by the data-type region descriptors of the dPLB (and Region Table) that are associated with the thread-turf pair and have "write" permission.

In block 1401, the Load/Store Unit evaluates the address argument(s) of the LOAD or STORE operation to derive an effective virtual address for the operation. The base address "dpReg" register of the turf-specific registers 211B for the given thread-turf pair (and/or one or more other supported address registers for the given thread-turf pair) can be accessed to generate the effective virtual address for the LOAD or STORE operation where the address argument of the LOAD or STORE operation is an address that is offset from the base address stored in the "dpReg" register. It is also possible that the effective virtual address for the LOAD or STORE operation can be generated without access to the base address stored in the "dpReg" register (and/or without access to other supported address registers for the given thread-turf pair) where self-relative addressing is used.

In block 1403, the Load/Store Unit (or other CPU hardware) accesses the hardware register(s) of the CPU storing the descriptors pointing to the memory region storing constants (only for LOAD) and non-static data (for both LOAD and STORE) for the turf ID-thread ID pair at the time of the operation. These registers can include the cWKR and dWKR hardware registers (211B) specific to the turf of the thread ID-turf ID pair, registers storing stacklet descriptors (211C) for thread ID-turf ID pair, and registers storing thread local storage descriptors (211D) specific to the thread of the thread ID-turf ID pair.

In block 1405, the Load/Store Unit (or other CPU hardware) checks whether the memory regions for the turf ID-thread ID pair (as dictated by such descriptors accessed in block 1403) cover the effective virtual address resulting from the evaluation of the address argument(s) in block 1401. This condition can be determined by comparing the virtual address range for the cache line referenced by the effective virtual address to the virtual address range for the memory region(s) pointed to by the descriptors accessed in block 1403 to ascertain whether the virtual address range for the cache line referenced by the effective address lies within the virtual address range for the memory region(s) pointed to by such descriptors. If the check of block 1405 passes, the operations continue to block 1407; otherwise, the operations continue to block 1409.

In block 1407, the Load/Store Unit uses the effective virtual address resulting from the evaluation of the address argument(s) in block 1401 to issue a memory request (a load-type memory request for a LOAD operation and a store-type request for a STORE operation) to the L1 Data Cache 119 of the hierarchical memory system without protection checking by the dPLB, which avoids the computational resources and power in checking the dPLB.

In block 1409, the Load/Store Unit uses the effective virtual address resulting from the evaluation of the address argument(s) in block 1401 to issue a memory request (a load-type memory request for a LOAD operation and a store-type request for a STORE operation) to the L1 Data Cache 119 in conjunction with protection checking by the dPLB (blocks 1411 to 1421). Note that for a STORE operation, the results of any irreversible action that is part of the STORE operation can be held in a temporary buffer until the protection check by the dPLB completes successfully. At that time, the results of such irreversible action can be effectively written to the L1 Data Cache 119.

In block 1411, the dPLB hardware accesses and queries (looks-up) the entries of dPLB to identify one or more data-type region descriptors stored in the dPLB (or possibly stored in the Region Table if missed in the dPLB) where such one or more data-type region descriptors have i) a thread ID-turf ID pair that matches the thread ID-turf-ID pair at the time of the LOAD or STORE operation and ii) data that specifies a memory region that covers the virtual address resulting from the evaluation of the address argument(s) of the LOAD or STORE operation in block 1401. The second condition ii) can be determined by comparing the virtual address range for the cache line referenced by the effective virtual address derived from the address argument(s) in block 1401 to the virtual address range for the memory region(s) specified by the matching data-type region descriptors to ascertain whether the virtual address range for the referenced cache line lies within the virtual address range for the memory region(s) pointed to by the matching data-type region descriptors.

In block 1413, the dPLB hardware processes the permission parameters for the matching data-type region descriptor(s) identified in block 1411 to determine if such permission parameters specify a "read" permission throughout (for LOAD) or a "read" permission throughout (for STORE).

In block 1415, the dPLB hardware checks that the permission parameters processed in block 1413 specify the requisite permissions ("read" permission throughout (for LOAD) or a "write" permission throughout (for STORE)). If this check passes, the operations continue to block 1417; otherwise, the operations continue to block 1419.

In block 1417, the dPLB hardware grants permission for completion of the memory request initiated in block 1409.

In block 1419, the effective virtual memory address of the LOAD or STORE operation falls outside the protection domain of the thread-turf pair. In this case, the dPLB hardware denies permission for completion of the memory request initiated in block 1409 (which can prohibit the requested cache line from being stored into the L1 Data Cache 119) and raises a fault or triggers other suitable error handling as desired and the processing ends.

The processing pipeline of the CPU can support GRANT and REVOKE operations. The GRANT operation, which is specific to a particular thread, defines the protection domain specific to the particular thread (particularly the instruction-type and data-type region descriptors specific to the particular thread). The GRANT operation is processed by the CPU hardware to grant a subset of the memory regions that are associated with the specific thread to another turf or thread, with a subset of its permissions. The instruction-type region descriptors generated by the actions of the GRANT operation are added to the iPLB and the data-type region descriptors generated by the actions of the GRANT operation are added to the dPLB. There is no implicit duration limit associated with the GRANT operation.

The REVOKE operation is processed by the CPU hardware operation to unwind a specified previously executed GRANT operation. The REVOKE operation can be explicit or implicit. In this manner, the GRANT operations may be individually revoked, in any order. If a particular GRANT operation is not revoked, it persists for the life of the thread-turf pair that contained the particular GRANT operation. The processing of the REVOKE operation functions to remove the memory regions (and associated subset of permissions) as granted to a turf or thread by the most recently executed GRANT operation. The instruction-type region descriptors generated by the actions of the identified previous GRANT operation are removed from the iPLB (and/or the Region Table if stored there), and the data-type region descriptors generated by the actions of the identified previous GRANT operation are removed from the dPLB (and/or the Region Table if stored there).

In one embodiment, the CPU hardware can be configured on boot to provide a root turf containing the entirety of the virtual address space of the memory system with full rights for both code and data to the first thread. From there on out the first thread can utilize GRANT operations to pass on any right and region subdivision as it sees fit to other threads, which those threads can also do to what they received. In this manner, the assignment of protection domains to the executing threads cascades down the logical chain of threads as such threads are executed on the CPU.

The entries of the iPLB and dPLB can use a single bit (referred to herein as a "novel bit") to manage the discard process of such entries. Specifically, the entries for newly granted region descriptors that are added to the iPLB and the dPLB each have their novel bit set. The novel bit of the entry is cleared when the entry is evicted and lowered to the Region Table. The cleared novel bit is included in the PLB entry when the region descriptor is hoisted from the Region Table when missed in the iPLB or dPLB. Matching entries for region descriptors that have been revoked are looked up in the iPLB or dPLB. If a matching entry has its novel bit set, the regions descriptor of the matching entry can be discarded from the iPLB or dPLB without processing the Region Table. If a matching entry has its novel bit cleared, the regions descriptor of the matching entry can be discarded from the iPLB or dPLB and also discarded from the Region Table (where the discard from the Region Table can be a lazy process if desired).

The processing pipeline of the CPU can also support a PASS operation that involves an implicit and temporary grant of the memory regions that are associated with a specific thread (with all of the permissions of the thread) to a wildcard turf. The instruction-type region descriptors of the specific thread are modified to specify a wildcard turf and added to the iPLB and the data-type region descriptors of the specific thread are modified to specify a wildcard turf and added to the dPLB. The PASS operation can be grouped with a portal-type CALL operation. After the portal-type CALL operation, the Callee function executes in the same thread but in a different turf. Because of the wildcard turf of the region descriptors added to the iPLB and dPLB, the rights for the corresponding memory regions passed by the PASS operation apply. When a RETURN operation from the portal Callee function is executed, the region descriptors added to the iPLB and dPLB by the PASS operation are removed in in order to remove the permissions temporarily granted by the PASS operation. Note that the PASS operation lets the Callee function see the private data of the Caller function. Furthermore, the temporary grant of the memory regions arising from the PASS operation cannot be revoked by any explicit REVOKE operation. Instead, they survive until control is returned to the Caller function that made the PASS operation, and then are revoked automatically. Because stack frames nest, the lifetimes of the memory regions arising from nested PASS operations also best.

Figure 15:
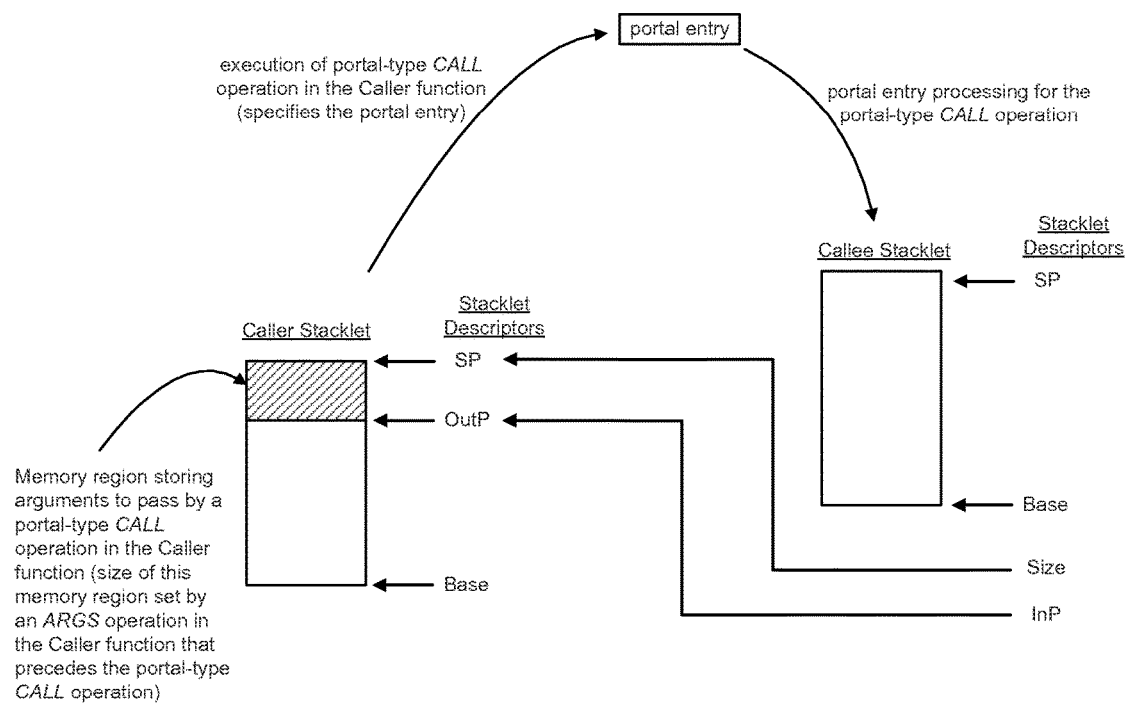
FIG. 15 is a schematic diagram of the processing of an ARGS operation and portal-type CALL operation that cooperate to pass one or more arguments stored in the stacklet of a Caller function to a Callee function according to an embodiment of the present disclosure.

The processing pipeline of the CPU can also support an ARGS operation, which ordinarily has nothing to do with granting rights. As evident from the schematic diagram of FIG. 15, the actions of the ARGS operation can reserve a portion of the top stack frame of the current thread-turf pair (Caller function) by setting a defined hardware register of the CPU (the "OutP" register) to some value below the stack pointer "SP" as needed. When processing a portal-type CALL operation that follows the ARGS operation in the Caller function, the processing of the portal entry specified by the a portal-type CALL operation involves the CPU hardware i) initializing a stack frame as part of the stacklet of the Callee function and ii) storing stacklet descriptors for the stack frame of the stacklet of the Callee function into the defined thread-turf specific registers of the CPU as described herein. Such stacklet descriptors can include a pointer "InP" and "Size" descriptors that describe the reserved portion of the top stack frame of the Caller function. In this case, the pointer "InP" can be copied from the pointer value stored in the "OutP" register for the Caller function. This processing allows the Callee function to have access to the reserved portion of the top stack frame of the Caller function. As this reserved data stack portion is part of the stacklet of the thread, this processing can be performed for normal-type CALL operations as well.

Note that the processing of the portal-type CALL operations as described herein affords an efficient mechanism to provide separate and distinct protection domains between the Caller (Source) and Callee (Sink) code portions that execute in the same thread. Furthermore, the context that needs to be accessed from memory in crossing the protection barrier can be contained in two cache lines. Furthermore, the portal entries that provide gateways between the protection domains can be user-defined and allow the services that are referred to by such portal entries to be contained in small protected packages. Furthermore, the protection domains defined by the memory regions and turfs of the protection-lookaside buffer(s) and Region Table can be counted in the thousands or tens of thousands on a system. This is relatively coarsely grained security. These features all work together to provide a flexible, reliable, and efficient security framework. Specifically, the features can avoid full context switches that are incredibly expensive. Modern CPUs often spend a third or more of their cycles on context switches and related management like TLB and cache shuffling. For example, a full context switch can run into hundreds of machine cycles just to change the processor core state. And on top of is added machine cycle delays due to cache thrashing and the memory accesses required to switch the working data sets.

There have been described and illustrated herein several embodiments of a computer processor and corresponding method of operations. While particular embodiments of the invention have been described, it is not intended that the invention be limited thereto, as it is intended that the invention be as broad in scope as the art will allow and that the specification be read likewise. For example, the micro-architecture and memory organization of the CPU as described herein is for illustrative purposes only. A wide variety of CPU microarchitectures can embody the improvement and methods described herein, including microarchitectures that employ in-order execution, microarchitectures that employ out-of-order execution, superscalar microarchitectures, VLIW microarchitectures, single-core microarchitectures, multi-core microarchitectures, and combinations thereof. In another example, the functionality of the CPU 101 as described herein can be embodied as a processor core and multiple instances of the processor core can be fabricated as part of a single integrated circuit (possibly along with other structures). In still another example, the security protection mechanisms as described herein can be applied to memory regions that are defined in the physical address of main memory of the CPU. In this case, the protection checking can be carried out in conjunction with virtual-to-physical address translation mechanism (TLB processing). The CPU can also implement other adaptations and extensions of the hardware-based protection mechanisms as described herein. It will therefore be appreciated by those skilled in the art that yet other modifications could be made to the provided invention without deviating from its spirit and scope as claimed.

The invention claimed is:

1. A computer processor comprising:
an instruction processing pipeline that interfaces to a hierarchical memory system employing an address space, wherein the instruction processing pipeline includes execution logic that executes at least one thread in different protection domains over time;
wherein said protection domains are defined by regions descriptors, each region descriptor including first data specifying a memory region of the address space employed by the hierarchical memory system and second data specifying permissions for accessing the associated memory region;
wherein said protection domains are further defined by turfs, each turf representing a collection of region descriptors and identified by a corresponding turf ID;
wherein a particular thread as identified by a corresponding thread ID executes in a particular turf that is associated with the particular thread, one turf at a time; and
wherein said protection domains are represented by entries stored in at least one table that is queried in conjunction with servicing requests that access the hierarchical memory system, each table entry corresponding to a given region descriptor and including the first data and the second data for the given region descriptor as well as a thread ID and a turf ID, the turf ID of the table entry specifying a turf to which the given region descriptor belongs, and the thread ID of the table entry specifying a thread that executes in the turf identified by the turf ID of the table entry.

2. A computer processor according to claim 1, wherein: the address space comprises one of a virtual address space and a physical address space.

3. A computer processor according to claim 1, wherein: the particular turf that a thread executes in is selectively configured to change over time.

4. A computer processor according to claim 1, wherein: the thread ID of each table entry has a configuration that specifies a wildcard identifier corresponding to any thread being executed by the execution logic; and
the turf ID of each table entry has a configuration that specifies a wildcard identifier corresponding to any turf being executed by the execution logic.

5. A computer processor according to claim 1, wherein: the hierarchical memory system includes a top level instruction cache separate from a top level data cache; and
the protection domains for memory regions that store instructions are represented by said table entries as stored in a first hardware table that is queried in conjunction with servicing fetch requests that are issued to the top level instruction cache for accessing instruction portions stored in the top level instruction cache, and the protection domains for memory regions that store operand data are represented by said table entries as stored in a second hardware table that is queried in conjunction with servicing memory requests that are issued to the top level data cache for loading operand data from or storing operand data in the top level data cache.

6. A computer processor according to claim 5, wherein: the second data for region descriptors stored in the first hardware table selectively specify an execute permission or a portal permission; and
the second data for region descriptors stored in the second hardware table selectively specify a write permission or a read permission.

7. A computer processor according to claim 5, wherein: the first hardware table is queried in parallel with querying the top level instruction cache, and the second hardware table is queried in parallel with querying the top level data cache.

8. A computer processor according to claim 1, wherein: the protection domains are further defined by descriptors for predefined memory regions of the address space that are stored in hardware registers of the computer processor.

9. A computer processor according to claim 8, wherein: the predefined memory regions include at least one memory region selected from the group including: at least one turf-specific memory region, at least one thread-turf-specific memory region, and at least one thread-specific memory region.

10. A computer processor according to claim 9, wherein: the at least one turf-specific memory region includes a first memory region that stores instructions for a particular turf, a second memory region that stores constants for a particular turf, and a third memory region that stores data for the particular turf.

11. A computer processor according to claim 9, wherein: the at least one thread-turf-specific memory region includes a memory region that stores a stack portion for a particular thread-turf pair.

12. A computer processor according to claim 9, wherein: the at least one thread-specific memory region includes a memory region that stores thread local data for a particular thread.

13. A computer processor according to claim 8, wherein: the hardware registers that store the descriptors for the predefined memory regions of the address space are accessed and processed in order to perform protection checking before querying the at least one table that stores the table entries representing the protection domains for protection checking.

14. A computer processor according to claim 13, wherein: in certain circumstances, the protection checking carried out by accessing and processing the hardware registers that store the descriptors for the predefined memory regions of the address space avoids the protection checking carried out by accessing and processing the at least one table that stores the table entries representing the protection domains.

15. A computer processor according to claim 1, wherein: at least one region descriptor is associated with a given thread by a GRANT operation processed by the instruction processing pipeline.

16. A computer processor according to claim 15, wherein: at least one region descriptor is disassociated with a given thread by a REVOKE operation processed by the instruction processing pipeline.

17. A computer processor according to claim 16, wherein: the REVOKE operation unwinds a specified previously executed GRANT operation.

18. A computer processor according to claim 16, wherein: the REVOKE operation is an explicit or implicit operation that is processed by the instruction processing pipeline.

19. A computer processor according to claim 1, wherein:
at least one region descriptor is temporarily associated with a given thread by a PASS operation processed by the instruction processing pipeline.

20. A computer processor according to claim 19, wherein:
the actions of the PASS operation modify the region descriptors that are associated with a specific thread to a wildcard turf.

21. A computer processor according to claim 20, wherein:
the PASS operation is grouped with a CALL operation, and when a corresponding RETURN operation is executed, the region descriptors resulting from the PASS operation are removed in order to remove the permissions temporarily granted by the PASS operation.

22. A computer processor according to claim 1, wherein:
the at least one table comprises at least one hardware table that is backed to a region table stored in the memory system; and
the table entries of the at least one hardware table each further include a single bit that is processed when first adding the corresponding table entry to the at least one hardware table and evicting the corresponding table entry from the at least one hardware table in order to remove the corresponding entry from the at least one hardware table without accessing the region table for circumstances when the corresponding table entry is not located in the region table.

23. A computer processor according to claim 1, wherein:
the first data of at least one region descriptor as stored in the at least one table specifies a memory region storing a portal entry associated with a particular function or service, wherein the portal entry includes address data that refers to the entry address of the particular function or service such that the portal entry acts as indirect interface to the execution of the particular function or service.

24. A computer processor according to claim 23, wherein:
the instruction processing pipeline supports a portal-type CALL operation with a pointer argument that refers to a given portal entry, wherein the actions of the portal-type CALL operation process the given portal entry to selectively switch to a different protection domain defined by the given portal entry; and
the given portal entry further includes a turf ID that refers to the protection domain which is used during execution of the particular function or service associated with the given portal entry.

25. A computer processor according to claim 24, wherein:
the given portal entry further includes state information that is restored to hardware registers for use during execution of the particular function or service.

26. A computer processor according to claim 24, wherein:
for the at least one region descriptor that specifies a memory region storing a portal entry, the second data of such region descriptor as stored in the at least one table includes a portal permission; and
the portal permission of the second data of said region descriptor as stored in the at least one table is processed in conjunction with the execution of the portal-type CALL operation to distinguish the portal-type CALL operation from a normal-type CALL operation.

27. A computer processor according to claim 1, wherein:
the address space comprises a virtual address space; and
the hierarchical memory system comprises at least one virtual cache.

28. A computer processor according to claim 1, wherein:
the at least one table comprises at least one hardware table.

* * * * *